US012192395B2

(12) United States Patent
Feng et al.

(10) Patent No.: US 12,192,395 B2
(45) Date of Patent: Jan. 7, 2025

(54) AUDIO MODULE DETECTION METHOD, ELECTRONIC DEVICE AND COMPUTER STORAGE MEDIUM

(71) Applicant: HONOR DEVICE CO., LTD., Guangdong (CN)

(72) Inventors: Yingqun Feng, Shenzhen (CN); Lixin Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/908,875

(22) PCT Filed: Apr. 26, 2022

(86) PCT No.: PCT/CN2022/089390
§ 371 (c)(1),
(2) Date: Sep. 1, 2022

(87) PCT Pub. No.: WO2023/000748
PCT Pub. Date: Jan. 26, 2023

(65) Prior Publication Data
US 2024/0205324 A1    Jun. 20, 2024

(30) Foreign Application Priority Data

Jul. 23, 2021  (CN) .......................... 202110839172.8

(51) Int. Cl.
*H04M 1/24* (2006.01)
*H04M 1/60* (2006.01)
*H04R 29/00* (2006.01)

(52) U.S. Cl.
CPC ........... *H04M 1/24* (2013.01); *H04M 1/6016* (2013.01); *H04R 29/004* (2013.01); *H04R 2499/11* (2013.01)

(58) Field of Classification Search
CPC .... H04M 1/24; H04M 1/6016; H04R 29/001; H04R 29/004; H04R 2499/11
See application file for complete search history.

(56) References Cited

U.S. PATENT DOCUMENTS 9,832,582 B2   11/2017  Chen et al.
10,231,070 B2   3/2019  Yang et al.
(Continued)

FOREIGN PATENT DOCUMENTS

CN   103501375 A   1/2014
CN   103929707 A   7/2014
(Continued)

*Primary Examiner* — Kile O Blair
(74) *Attorney, Agent, or Firm* — Fish & Richardson P.C.

(57) ABSTRACT

This application provides an audio module detection method, an electronic device and a computer storage medium An electronic device to which the audio module detection method is applied includes an audio output module, a first audio collection module, and a second audio collection module. The method includes: when the audio output module outputs first audio, obtaining first energy data indicating volume of the first audio collected by the first audio collection module by using the first audio collection module, and obtaining second energy data indicating volume of the first audio collected by the second audio collection module by using the second audio collection module; and determining, based on the first energy data and the second energy data, whether holes of an audio module are blocked, where the audio module is the audio output module, the first audio collection module, or the second audio collection module.

20 Claims, 21 Drawing Sheets

(56) References Cited

U.S. PATENT DOCUMENTS

| | | |
|---|---|---|
| 11,234,089 B2 | 1/2022 | Yan |
| 2015/0304786 A1 | 10/2015 | Partio et al. |
| 2021/0058724 A1 | 2/2021 | An et al. |
| 2021/0142795 A1 | 5/2021 | Yan |

FOREIGN PATENT DOCUMENTS

| | | |
|---|---|---|
| CN | 105979053 A | 9/2016 |
| CN | 106453970 A | 2/2017 |
| CN | 106717027 A | 5/2017 |
| CN | 106851516 A | 6/2017 |
| CN | 106911996 A | 6/2017 |
| CN | 107548564 A | 1/2018 |
| CN | 108076226 A | 5/2018 |
| CN | 108124042 A | 6/2018 |
| CN | 108958699 A | 12/2018 |
| CN | 109218913 A | 1/2019 |
| CN | 109769191 A | 5/2019 |
| CN | 113746976 A | 12/2021 |
| EP | 3820162 A1 | 5/2021 |
| EP | 3823311 A1 | 5/2021 |
| WO | 2017185342 A1 | 11/2017 |
| WO | 2021043414 A1 | 3/2021 |

AUDIO MODULE DETECTION METHOD, ELECTRONIC DEVICE AND COMPUTER STORAGE MEDIUM

CROSS-REFERENCE TO RELATED APPLICATIONS

This application is a National Stage of International Application No. PCT/CN2022/089390, filed Apr. 26, 2022, which claims priority to Chinese Patent Application No. 202110839172.8, filed Jul. 23, 2021. both of which are hereby incorporated by reference in their entireties.

TECHNICAL FIELD

This application relates to the field of terminal technologies, and in particular, to an audio module detection method, an electronic device and a computer storage medium.

BACKGROUND

After an electronic device is used for a period of time, holes of an audio collection module or an audio output module may be blocked due to adsorption of impurities, which affects an audio effect in a process of using audio by a user, resulting in extremely poor user experience.

A mobile phone is used as an example. When holes of an audio collection module (such as a microphone) of the mobile phone are blocked, a communication peer may not hear clearly in a call scenario, and volume of a recorded audio file is too small in a recording scenario. When holes of an audio output module (such as an earpiece or a speaker) of the mobile phone are blocked by impurities, a communication local end may not hear clearly in a call scenario, and volume of a recorded audio file is too small in a recording scenario.

Currently, in view of the problem of hole blocking of the audio collection module or the audio output module, the audio collection module is usually used to collect audio output by an audio output module, and whether holes of the audio collection module or the audio output module are blocked is determined based on the collected data. This solution easily leads to misdetermining.

SUMMARY

This application provides an audio module detection method, an electronic device and a computer storage medium, to use two pieces of energy data collected by two audio collection modules to perform hole blocking detection on an audio module of an electronic device, thereby reducing a misdetermining rate.

To achieve the foregoing objective, this application uses the following technical solutions.

According to a first aspect, this application provides an audio module detection method. The audio module detection method is applied to an electronic device. The electronic device includes an audio output module (such as a speaker A1 or an earpiece A2), a first audio collection module (such as a microphone B1), and a second audio collection module (such as a microphone B2). The audio module detection method includes: when the audio output module outputs first audio, obtaining first energy data by using the first audio collection module, and obtaining second energy data by using the second audio collection module, where the first energy data is used to indicate volume of the first audio collected by the first audio collection module, and the second energy data is used to indicate volume of the first audio collected by the second audio collection module; and determining, based on the first energy data and the second energy data, whether holes of an audio module (namely, a detected audio module) are blocked, where the audio module is the audio output module, the first audio collection module, or the second audio collection module.

It should be understood that, in other embodiments, the first audio collection module may alternatively be the microphone B2, and the second audio collection module may alternatively be the microphone B1, which is not specifically limited in this embodiment of this application.

In the foregoing audio module detection method, the first audio output by the audio output module is collected by the first audio collection module and the second audio collection module, and a hole blocking status of the audio module is determined based on the first energy data and the second energy data obtained through collection. This can reduce a misdetermining rate when compared with a solution of using a single audio collection module for detection. Specifically, if the first energy data obtained by the first audio collection module by collecting the first audio output by the audio output module is used to determine the hole blocking status of the audio module, a hole blocking problem may occur in both the first audio collection module and the audio output module, which can both greatly reduce the first energy data. Therefore, whether the first audio collection module or the audio output module has the problem cannot be determining by relying only on the first energy data, and consequently, misdetermining is likely to occur. In this method, when different audio modules are blocked, the first energy data and the second energy data are affected differently. In view of this, based on different impact on the first energy data and the second energy data, the audio module with blocked holes can be accurately determined, to avoid misdetermining. In addition, regardless of whether the audio module is the audio output module, the first audio collection module, or the second audio collection module, only two pieces of data need to be collected for detection: the first energy data and the second energy data. In other words, only a set of data needs to be collected to complete hole blocking detection on the three modules, and a process of data collection is simple.

Optionally, the determining, based on the first energy data and the second energy data, whether holes of an audio module are blocked specifically includes: determining first status information based on the first energy data, where the first status information is used to indicate whether the first energy data is affected by hole blocking; determining second status information based on the second energy data, where the second status information is used to indicate whether the second energy data is affected by hole blocking; and determining, based on the first status information and the second status information, whether the audio module is blocked.

In this example, for blocking of different audio modules, the first energy data and the second energy data are affected differently, and therefore the first status information and the second status information indicate different information. In view of this, based on a difference between the first status information and the second status information, the audio module with blocked holes can be accurately determined, to avoid misdetermining.

In some embodiments, the determining, based on the first status information and the second status information, whether the audio module is blocked specifically includes: when the audio module is the audio output module, determining that holes of the audio output module are blocked if the first status information indicates that the first energy data is affected by hole blocking and the second status information indicates that the second energy data is affected by hole blocking; when the audio module is the first audio collection module, determining that holes of the first audio collection module are blocked if the first status information indicates that the first energy data is affected by hole blocking and the second status information indicates that the second energy data is not affected by hole blocking; or when the audio module is the second audio collection module, determining that holes of the audio output module are blocked if the first status information indicates that the first energy data is not affected by hole blocking and the second status information indicates that the second energy data is affected by hole blocking.

In this embodiment, both the second energy data and the first energy data are related to the audio output module. Therefore, if holes of the audio output module are blocked, both the first energy data and the second energy data are affected. In this case, the first status information indicates that the first energy data is affected by hole blocking and the second status information indicates that the second energy data is affected by hole blocking. If holes of the first audio collection module are blocked, only the first energy data is affected. In this case, the first status information indicates that the first energy data is affected by hole blocking and the second status information indicates that the second energy data is not affected by hole blocking. If holes of the second audio collection module are blocked, only the second energy data is affected. In this case, the second status information indicates that the second energy data is affected by hole blocking and the first status information indicates that the first energy data is not affected by hole blocking. Based on different cases of information indicated by the first status information and the second status information when different audio modules are blocked, which audio module with blocked holes can be accurately determined.

In some other embodiments, the determining, based on the first status information and the second status information, whether the audio module is blocked specifically includes: when the audio module is the audio output module, increasing a first quantity of hole blocking times (as shown by a quantity of hole blocking times in FIG. 10 or a quantity of hole blocking times in FIG. 12) if the first status information indicates that the first energy data is affected by hole blocking and the second status information indicates that the second energy data is affected by hole blocking; and determining that holes of the audio output module are blocked if the first quantity of hole blocking times is greater than a first preset quantity of hole blocking times; or when the audio module is the first audio collection module, increasing a second quantity of hole blocking times (as shown by a quantity of hole blocking times in FIG. 14) if the first status information indicates that the first energy data is affected by hole blocking and the second status information indicates that the second energy data is not affected by hole blocking; and determining that holes of the first audio collection module are blocked if the second quantity of hole blocking times is greater than a second preset quantity of hole blocking times; or when the audio module is the second audio collection module, increasing a third quantity of hole blocking times if the first status information indicates that the first energy data is not affected by hole blocking and the second status information indicates that the second energy data is affected by hole blocking, and determining that holes of the second audio collection module are blocked if the third quantity of hole blocking times is greater than a third preset quantity of hole blocking times (as shown by a quantity of hole blocking times in FIG. 16).

In this embodiment, compared with the previous embodiment, a condition is added for determining hole blocking of a corresponding audio module only when the quantity of hole blocking times is greater than the preset quantity of hole blocking times. In this way, energy data of the first audio at different moments can be collected to perform determining for a plurality of times. Compared with energy data collected only at one moment, because single data may be occasional, this embodiment can reduce a misdetermining rate of hole blocking.

In some embodiments of this application, the first energy data is volume collected by the first audio collection module at a first level gain or a plurality of second level gains when the audio output module outputs the first audio at a first volume level. The first volume level is any volume level of at least two preset volume levels, the first level gain is any level gain of at least two first preset level gains, and the plurality of second level gains are any multiple level gains in the at least two first preset level gains. The second energy data is volume collected by the first audio collection module at a third level gain or a plurality of fourth level gains when the audio output module outputs the first audio at a second volume level. The second volume level is any volume level of the at least two preset volume levels, the third level gain is any volume level of at least two second preset level gains, and the plurality of fourth level gains are any multiple volume levels in the at least two second preset level gains.

In this embodiment, the first volume level and the second volume level may be any volume levels, and the first level gain, the second level gain, the third level gain, and the fourth level gain may also be any level gains. Therefore, there is no need to adjust the volume level of the audio output module to a specific volume level, or adjust the level gains of the first audio collection module and the second audio collection module to specific level gains. In this way, firstly, there is no need to adjust the volume level to a specific volume level, so as to avoid a problem that audio output by the audio output module (such as the speaker A1) suddenly becomes small or large due to adjustment of the volume level. This helps ensure auditory experience of a user. Especially in a case in which the first audio is audio output by the audio output module in the user's routine use of the audio output module, this embodiment does not affect experience of the user's routine use of the audio output module. Secondly, at different level gains, volume of the detected audio module weakened by hole blocking is not constant. In this embodiment, detection is performed at any level gain, which can avoid misdetermining caused by data occasionally. Thirdly, a volume level and a level gain set by the user during routine use of the electronic device are uncertain, and in this embodiment, implementation is supported at any volume level and any level gain. Therefore, this embodiment can be implemented at any moment of routine audio outputting by the audio output module.

It should be noted that, in other embodiments, volume levels may alternatively not be divided for the audio output module of the electronic device, and level gains may alternatively not be divided for the audio collection module. In this way, the first energy data and the second energy data may be obtained respectively by the first audio collection module and the second audio collection module under any circumstance during a process of outputting the first audio by the audio output module. In this case, both the first energy data and the second energy data are still related to the audio output module. Therefore, when different audio modules are blocked, extents to which the first energy data and the second energy data are affected are still different. Therefore, based on different impact on the first energy data and the second energy data, the audio module with blocked holes can be accurately determined.

In a possible design solution, the audio module is the audio output module. The determining first status information based on the first energy data includes: determining the first status information based on first calibration data and the first energy data. If a difference between the first calibration data and the first energy data is greater than a first threshold, the first status information is used to indicate that the first energy data is affected by hole blocking. The first calibration data is volume collected by the first audio collection module without blocked holes when the audio output module outputs second audio without hole blocking. The determining second status information based on the second energy data includes: determining the second status information based on second calibration data and the second energy data. If a difference between the second calibration data and the second energy data is greater than a second threshold, the second status information is used to indicate that the second energy data is affected by hole blocking. The second calibration data is volume collected by the second audio collection module without blocked holes when the audio output module outputs the second audio without hole blocking.

In other words, if the difference between the first calibration data and the first energy data is greater than the first threshold, and the difference between the second calibration data and the second energy data is greater than the second threshold, it is determined that holes of the audio output module are blocked.

In this design solution, when holes of the audio output module are blocked, an energy value of the first audio output by the audio output module is weakened, so that both the first energy data collected by the first audio collection module and the second energy data collected by the second audio collection module greatly decrease. Both the difference between the first calibration data and the first energy data and the difference between the second calibration data and the second energy data increase. Whether holes of the audio output module are blocked can be determined by determining whether the difference between the first calibration data and the first energy data is greater than the first threshold capable of indicating hole blocking of the audio output module (a first condition) and whether the difference between the second calibration data and the second energy data is greater than the second threshold capable of indicating hole blocking of the audio output module (a second condition).

It should be noted that, in this design solution, using energy data collected by two microphones to determine a hole blocking status of the audio output module can reduce a misdetermining rate. Reasons are as follows: When holes of the audio output module are not blocked and holes of the first audio collection module or the second audio collection module are blocked, a microphone with blocked holes also weakens the energy value of the first audio, causing the first energy data to greatly decrease, and meeting the first condition. A case similar to hole blocking of the audio output module appears. In this case, if the hole blocking status of the audio output module is determined based on energy data collected by a single microphone, when the first condition is met, it is considered as hole blocking of the audio output module. Obviously, this is inconsistent with the fact that holes of the first audio collection module are blocked and holes of the audio output module are not blocked, thereby causing misdetermining. In addition, because a probability of hole blocking of a single microphone is relatively high, a probability that energy data collected by the microphone meets a hole blocking condition is relatively high, thereby resulting in a relatively high probability of misdetermining.

In order to determine an audio module with blocked holes, in this design solution, the second audio collection module is further introduced to collect the first audio output by the audio output module. When the audio module with blocked holes is the first audio collection module, the second energy data collected by the second audio collection module is not affected. Therefore, the difference between the second calibration data and the second energy data is not increased and is unlikely to be greater than the second threshold. The second condition for hole blocking of the audio output module is not met, and therefore misdetermining of hole blocking of the audio output module is avoided. In other words, unless holes of the audio output module are blocked, it is difficult for both the first condition and the second condition to be met. In addition, in this design scheme, hole blocking of both the first audio collection module and the second audio collection module also causes the first energy data and the second energy data to greatly decrease, and therefore it is possible that both the first condition and second condition are met. However, in a solution of using a single microphone for detection, because a probability of hole blocking of both the first audio collection module and the second audio collection module is relatively low, there is a relatively low possibility that both the first condition and the second condition are met because holes of both the first audio collection module and the second audio collection module are blocked. Therefore, compared with the solution of using a single microphone for detection, this embodiment helps reduce a misdetermining rate.

Optionally, if the difference between the first calibration data and the first energy data is greater than the first threshold, and the difference between the second calibration data and the second energy data is greater than the second threshold, the first quantity of hole blocking times is increased. In other words, it is determined that holes of the audio output module are blocked if the first quantity of hole blocking times is greater than the first preset quantity of hole blocking times.

In this embodiment, a condition is added for determining hole blocking of the audio output module only when the first quantity of hole blocking times is greater than the first preset quantity of hole blocking times. In this way, energy data of the first audio at different moments can be collected to perform determining for a plurality of times. Compared with energy data collected only at one moment, because single data may be occasional, this design solution can reduce a misdetermining rate of hole blocking.

Further, if the difference between the first calibration data and the first energy data is less than or equal to the first threshold, or if the difference between the second calibration data and the second energy data is less than or equal to the second threshold, whether the first quantity of hole blocking times is greater than a first preset quantity of baseline times is determined. If yes, the first quantity of hole blocking times is reduced.

In this embodiment, when the difference between the first calibration data and the first energy data is greater than the first threshold or the difference between the second calibration data and the second energy data is greater than the second threshold, it indicates that a current detection result is that holes are not blocked. In this case, in a previous detection process, the first quantity of hole blocking times (the part exceeding a first preset quantity of baseline times, that is, the part exceeding a preset quantity of baseline times in FIG. 10 or FIG. 12) accumulated because a detection result is hole blocking may be misdetermined. Therefore, when a current detection result is different from a previous test result, the first quantity of accumulated hole blocking times is reduced to offset a quantity of previously accumulated hole blocking times. This can prevent the first quantity of hole blocking times from exceeding the first preset quantity of hole blocking times caused by an excessive misdetermining quantity of single detection, and therefore prevent a final misdetermining result.

Optionally, the first energy data is energy data collected by the first audio collection module at the first level gain when the audio output module outputs the first audio at the first volume level. The first calibration data is energy data collected by the first audio collection module at the first level gain when the audio output module outputs the second audio at the first volume level. In this example, both the first energy data and the first calibration data are obtained at the first volume level and the first level gain, have comparability, and are useful for determining whether holes of the audio output module are blocked.

Optionally, the second energy data is energy data collected by the second audio collection module at the third level gain when the audio output module outputs the first audio at the second volume level. The second calibration data is energy data collected by the second audio collection module at the third level gain when the audio output module outputs the second audio at the second volume level. For an effect of this example, refer to the effect of the first energy data and the first calibration data. Details are not described herein again.

Optionally, the first energy data is determined based on a plurality of pieces of first detected energy data obtained by the first audio collection module. The plurality of pieces of first detected energy data are volume that has values in one-to-one correspondence with all second level gains and that is obtained by the first audio collection module at the plurality of second level gains when the audio output module outputs the first audio at the first volume level. The first calibration data is determined based on a plurality of pieces of first calibration energy data obtained by the first audio collection module. The plurality of pieces of first calibration energy data are volume that has values in one-to-one correspondence with all second level gains and that is obtained by the first audio collection module at the plurality of second level gains when the audio output module outputs the second audio at the first volume level.

In this example, both the first energy data and the first calibration data are obtained at the first volume level and the plurality of second level gains, have comparability, and are useful for determining whether holes of the audio output module are blocked. In addition, at different level gains, after holes of the audio output module are blocked, energy values weakened by hole blocking are not linear. Therefore, in this example, the first energy data and the first calibration data are determined respectively based on a plurality of pieces of first detection energy data and a plurality of pieces of first calibration energy data collected at a plurality of second level gains. This can more accurately represent a hole blocked state or a hole unblocked state of the audio output module when compared with detected energy data and calibration energy data at a single level gain, so as to avoid determining by using single pieces of detected energy data and calibration energy data with relatively large deviations, and therefore avoid a caused high misdetermining rate.

Optionally, the second energy data is determined based on a plurality of pieces of second detected energy data obtained by the second audio collection module. The plurality of pieces of second detected energy data are volume that has values in one-to-one correspondence with all fourth level gains and that is obtained by the second audio collection module at the plurality of fourth level gains when the audio output module outputs the first audio at the second volume level. The second calibration data is determined based on a plurality of pieces of second calibration energy data obtained by the second audio collection module. The plurality of pieces of second calibration energy data are volume that has values in one-to-one correspondence with all fourth level gains and that is obtained by the second audio collection module at the plurality of fourth level gains when the audio output module outputs the second audio at the second volume level. For an effect of this example, refer to the effect of the first energy data and the first calibration data. Details are not described herein again.

In another possible design solution, the audio module is the first audio collection module. The determining first status information based on the first energy data includes: determining the first status information based on whether the first energy data is less than a fourth threshold. If yes, the first status information is used to indicate whether the first energy data is affected by hole blocking. The determining second status information based on the second energy data includes: determining the second status information based on whether a difference between the first energy data and the second energy data is less than a third threshold. If yes, the second status information is used to indicate that the second energy data is not affected by hole blocking.

In other words, if a difference of the first energy data is less than the fourth threshold and the difference between the first energy data and the second energy data is less than the third threshold, it is determined that holes of the audio output module are blocked.

In this design solution, when holes of the first audio collection module are blocked, and when the first audio collection module collects the first audio output by the audio output module, the volume of the first audio is weakened, and consequently the collected first energy data is greatly reduced. However, the second audio collection module is not affected, and the second energy data collected by the second audio collection module is not be affected. Therefore, the difference between the first energy data and the second energy data is also reduced. Whether holes of the first audio collection module are blocked can be determined by determining whether the first energy data is less than the fourth threshold capable of indicating hole blocking of the first audio collection module (the first condition) and whether the difference between the first energy data and the second energy data is less than the third threshold capable of indicating that hole blocking of the first audio collection module (the second condition).

It should be noted that, in this design solution, using energy data collected by two microphones to determine a hole blocking status of the first audio collection module can reduce a misdetermining rate. Reasons are as follows: When holes of the audio output module are blocked and holes of the first audio collection module are blocked, the first energy data is also greatly reduced, and the first condition is met. A case similar to hole blocking of the first audio collection module appears. In this case, if a hole blocking status of the first audio collection module is determined based on energy data collected by a single microphone, when the first condition is met, it is considered as hole blocking of the first audio collection module. Obviously, this is inconsistent with the fact that holes of the first audio collection module are blocked and holes of the audio output module are not blocked, thereby causing misdetermining. In addition, because a probability of hole blocking of a single microphone is relatively high, a probability that energy data collected by the microphone meets a hole blocking condition is relatively high, thereby resulting in a relatively high probability of misdetermining. In order to determine an audio module with blocked holes, in this design solution, the second audio collection module is further introduced to collect the first audio output by the audio output module. When the audio module with blocked holes is the audio output module, impact on both the first energy data and the second energy data is greatly reduced, so that the difference between the first energy data and the second energy data does not change too much, and is unlikely to be less than the third threshold. The second condition for hole blocking of the first audio collection module is not met, and therefore misdetermining of hole blocking of the first audio collection module is avoided. In other words, unless holes of the first audio collection module are blocked, it is difficult for both the first condition and the second condition to be met.

In another possible design solution, the audio module is the first audio collection module. The determining, based on the first energy data and the second energy data, whether holes of an audio module are blocked includes: increasing a second quantity of hole blocking times if the difference between the first energy data and the second energy data is less than the third threshold and the first energy data is less than the fourth threshold; and if the second quantity of hole blocking times is greater than the second preset quantity of hole blocking times, determining that holes of the first audio collection module are blocked. For an effect of this embodiment, refer to a specific implementation effect of related content in the embodiment in which the audio module is the audio output module. Details are not described herein again.

Further, the audio module detection method further includes: determining whether the second quantity of hole blocking times is greater than a second preset quantity of baseline times (the preset quantity of baseline times shown in FIG. 14) if the difference between the first energy data and the second energy data is greater than or equal to the third threshold, or if the first energy data is greater than or equal to the fourth threshold; and if yes, reducing the second quantity of hole blocking times. For an effect of this embodiment, refer to a specific implementation effect of related content in the embodiment in which the audio module is the audio output module. Details are not described herein again.

Optionally, the first energy data is volume collected by the first audio collection module at the first level gain when the audio output module outputs the first audio at the first volume level. The second energy data is volume collected by the second audio collection module at the third level gain when the audio output module outputs the first audio at the second volume level.

In this example, both the first energy data and the second energy data are obtained at a single volume level and a single level gain. In this way, the first energy data and the second energy data are compared in a same dimension, and have comparability. A comparison result is also useful for determining whether holes of the first audio collection module are blocked.

Optionally, the first energy data is determined based on a plurality of pieces of third detected energy data obtained by the first audio collection module. The plurality of pieces of third detected energy data are volume that has values in one-to-one correspondence with all second level gains and that is obtained by the first audio collection module at the plurality of second level gains when the audio output module outputs the first audio at the first volume level. The second energy data is determined based on a plurality of pieces of fourth detected energy data obtained by the second audio collection module. The plurality of pieces of fourth detected energy data are volume that has values in one-to-one correspondence with all fourth level gains and that is obtained by the second audio collection module at the plurality of fourth level gains when the audio output module outputs the first audio at the second volume level.

In this example, both the first energy data and the second energy data are obtained at a single volume level and a plurality of level gains. In this way, the first energy data and the second energy data are compared in a same dimension, and have comparability. A comparison result is also useful for determining whether holes of the first audio collection module are blocked. In addition, in this example, for effects of determining the first energy data based on the plurality of pieces of first detected energy data, and determining the second energy data based on the plurality of pieces of second detected energy data, refer to related content in which the audio module is the audio output module. Details are not described herein again.

In another possible design solution, the audio module is the second audio collection module. The determining first status information based on the first energy data includes: determining the first status information based on whether a difference between the second energy data and the first energy data is less than a fifth threshold. If yes, the first status information is used to indicate that the first energy data is not affected by hole blocking. The determining second status information based on the second energy data includes: determining the second status information based on whether the second energy data is less than a sixth threshold. If yes, the second status information is used to indicate whether the second energy data is affected by hole blocking.

Optionally, the audio module is the second audio collection module. The determining, based on the first energy data and the second energy data, whether holes of an audio module are blocked includes: increasing a third quantity of hole blocking times if the difference between the first energy data and the second energy data is less than the fifth threshold and the first energy data is less than the sixth threshold; and if the third quantity of hole blocking times is greater than the third preset quantity of hole blocking times, determining that holes of the second audio collection module are blocked.

Further, the audio module detection method further includes: determining whether the third quantity of hole blocking times is greater than a third preset quantity of baseline times (the preset quantity of baseline times shown in FIG. 16) if the difference between the second energy data and the first energy data is greater than or equal to the fifth threshold, or if the first energy data is greater than or equal to the sixth threshold; and if yes, reducing the third quantity of hole blocking times.

Optionally, the first energy data is volume collected by the first audio collection module at the first level gain when the audio output module outputs the first audio at the first volume level. The second energy data is volume collected by the second audio collection module at the third level gain when the audio output module outputs the first audio at the second volume level.

Optionally, the first energy data is determined based on a plurality of pieces of first detected energy data obtained by the first audio collection module. The plurality of pieces of first detected energy data are volume that has values in one-to-one correspondence with all second level gains and that is obtained by the first audio collection module at the plurality of second level gains when the audio output module outputs the first audio at the first volume level. The second energy data is determined based on a plurality of pieces of second detected energy data obtained by the second audio collection module. The plurality of pieces of second detected energy data are volume that has values in one-to-one correspondence with all fourth level gains and that is obtained by the second audio collection module at the plurality of fourth level gains when the audio output module outputs the first audio at the second volume level.

It should be noted that, for an implementation effect of a related embodiment in which the audio module is the second audio collection module, reference may be made to the implementation effect of the embodiment in which the audio module is the first audio collection module. Details are not described herein again.

Further, the audio module detection method further includes: when it is determined that holes of the audio module are blocked, outputting hole blocking prompt information, and/or increasing a gain value of the audio module. In this way, when receiving the hole blocking prompt information, the user can clean up the audio module in time, thereby improving an audio effect of the audio module; or can improve the gain value of the audio module to compensate for a weakened energy value, thereby improving an audio effect of the audio module.

In some embodiments of this application, the electronic device has an enable control. The enable control is configured to enable an operation of detecting whether holes of the audio module are blocked. The electronic device detects whether holes of the audio module are blocked, in response to an enable operation of a user on the enable control, or based on a preset period, where the preset period is a time interval required for consecutively detecting twice whether holes of the audio module are blocked. This embodiment provides two manners of enabling a process of detecting whether holes of the audio module are blocked. When the user notices that an audio effect of the audio module is not good during use, the user can immediately check whether holes of the audio module are blocked by using the enable operation on the enable control. The electronic device may alternatively periodically check the audio module for a hole blocking status.

DESCRIPTION OF EMBODIMENTS

A typical electronic device includes an audio output module such as a speaker or an earpiece and an audio collection module such as a microphone. The audio output module is configured to convert an electrical signal into a sound signal, to output audio. The audio collection module is configured to convert a sound signal into an electrical signal. Specifically, quantities of audio output modules and audio collection modules included in the electronic device may differ according to different types.

Figure 1:
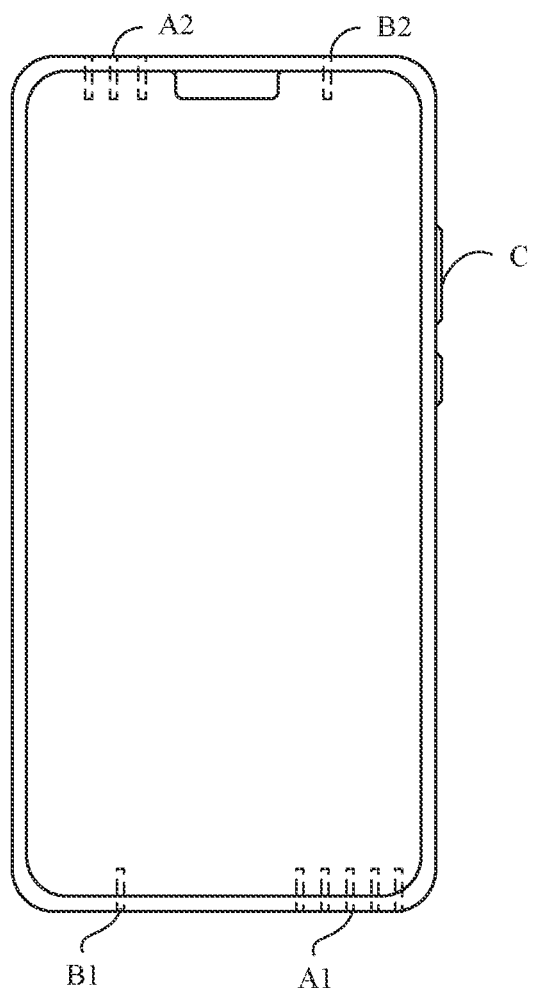
FIG. 1 is a schematic diagram of a structure of an electronic device according to an embodiment of this application.
Figure 2:
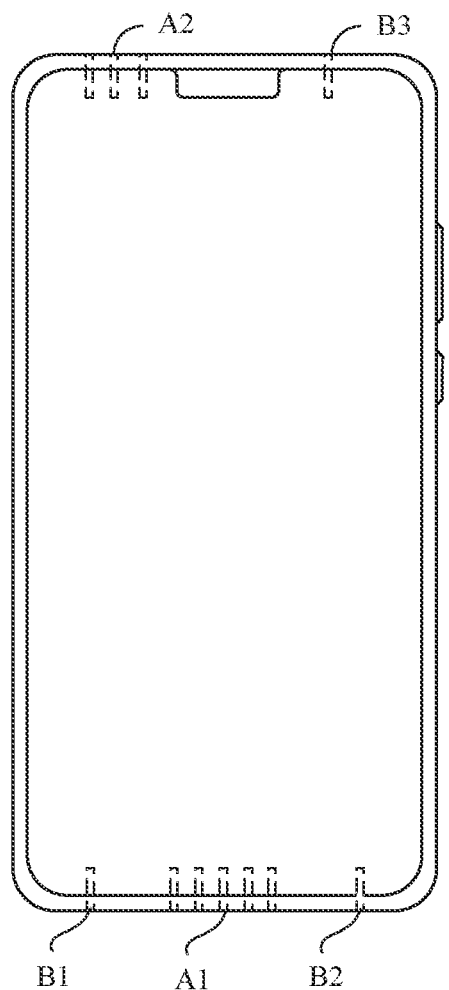
FIG. 2 is a schematic diagram of a structure of another electronic device according to an embodiment of this application.

For example, a mobile phone is used as an example. As shown in FIG. 1, an electronic device 100 may include two audio output modules: a speaker A1 and an earpiece A2, and two audio collection modules: a microphone B1 and a microphone B2. As shown in FIG. 2, the electronic device 100 may include two audio output modules: a speaker A1 and an earpiece A2; and three audio collection modules: a microphone B1, a microphone B2, and a microphone B3. In other embodiments, the electronic device may include audio output modules and audio collection modules of other quantities, which is not specifically limited in this application.

It should be understood that, in addition to a mobile phone, the electronic device in embodiments of this application may further include a device that includes an audio output module and an audio collection module, such as a tablet computer, a desktop computer, a laptop computer, a handheld computer, a notebook computer, an ultra-mobile personal computer (ultra-mobile personal computer, UMPC), a netbook, and a cellular phone, a wearable watch, or a TV. A specific form of the electronic device is not specially limited in the embodiments of this application. It should be further understood that although a mobile phone is used as an example in FIG. 1 and FIG. 2 to illustrate a case in which the audio output module includes a speaker and an earpiece, for electronic devices of different product forms, arrangements of audio output modules may be different. For example, the audio output module of the electronic device may alternatively include only a speaker, for example, a TV includes only a speaker. This is not limited in this embodiment of this application.

However, after the electronic device is used for a period of time, holes of the audio output module or the audio collection module may be blocked due to adsorption of impurities, which affects an audio effect in a process of using audio by a user, resulting in extremely poor user experience. In order to find an audio output module or audio collection module with blocked holes, this application provides an audio module detection method. The audio module detection method may be applied to the electronic device 100 shown in FIG. 1 or FIG. 2, and may be implemented in an electronic device 100 shown in FIG. 3.

Figure 3:
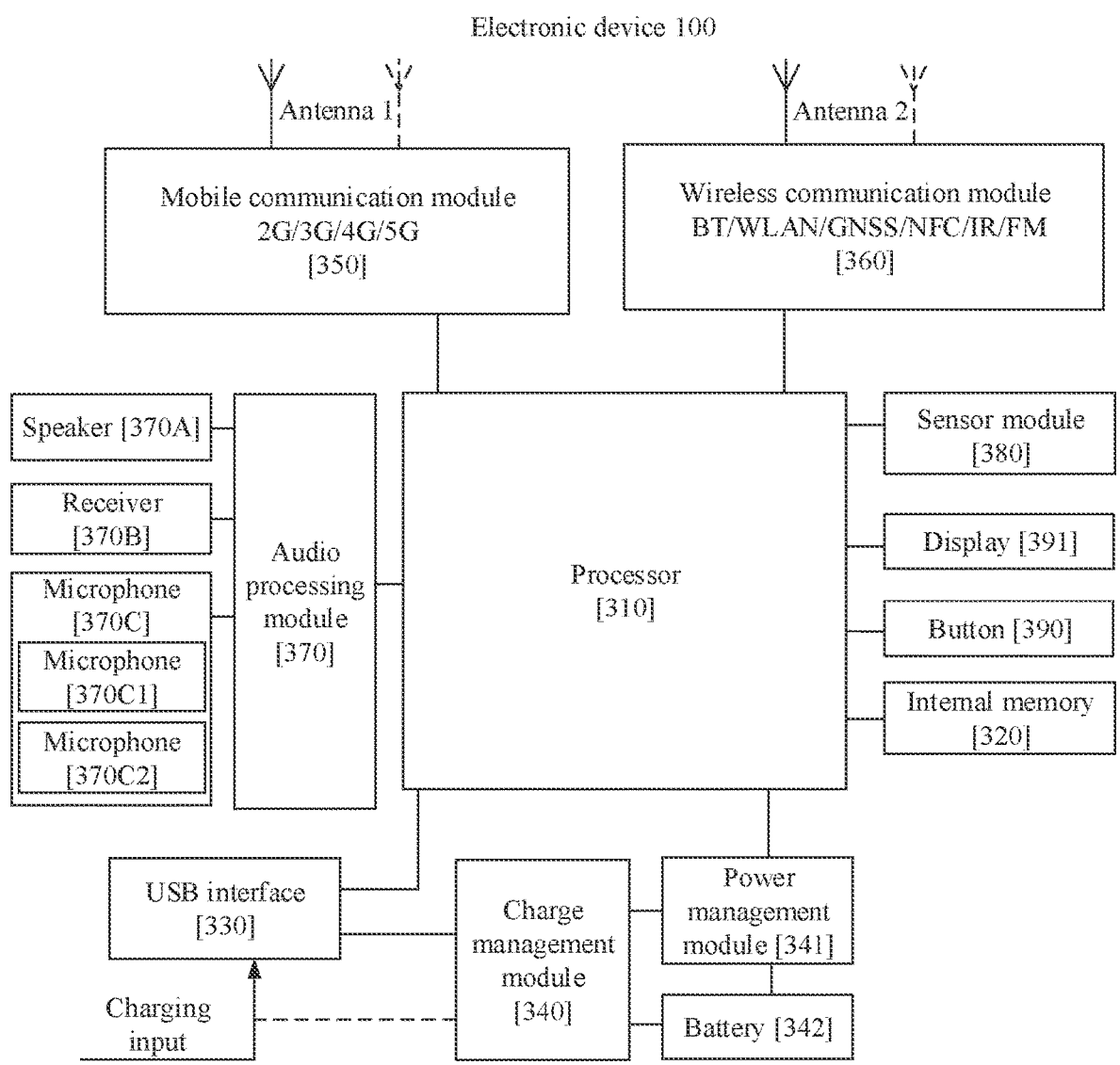
FIG. 3 is a schematic diagram of a structure of another electronic device according to an embodiment of this application.

Refer to FIG. 3. FIG. 3 is a schematic diagram of a structure of an electronic device 100 according to an embodiment of this application. As shown in FIG. 3, the electronic device 100 may include a processor 310, an internal memory 320, a universal serial bus (universal serial bus, USB) interface 330, a charge management module 340, a power management module 341, a battery 342, an antenna 1, an antenna 2, a mobile communication module 350, a wireless communication module 360, an audio processing module 370, a speaker 370A, a receiver 370B, a microphone 370C, a sensor module 380, a button 390, a display 391, and the like.

It may be understood that a structure shown in this embodiment does not constitute a specific limitation on the electronic device 100. In some other embodiments, the electronic device 100 may include more or fewer components than those shown in the figure, or some components may be combined, or some components may be split, or a different component arrangement may be used. The components shown in the figure may be implemented in hardware, software, or a combination of software and hardware.

The processor 310 may include one or more processing units. For example, the processor 310 may include an application processor (application processor, AP), a modem processor, a graphics processor (graphics processing unit, GPU), an image signal processor (image signal processor, ISP), a controller, a memory, a video codec, a digital signal processor (digital signal processor. DSP), a baseband processor, and/or a neural-network processing unit (neural-network processing unit, NPU), and the like. Different processing units may be independent devices, or may be integrated in one or more processors.

The controller may be a nerve center and a command center of the electronic device 100. The controller may generate an operation control signal based on an instruction operation code and a timing signal, to implement control on instruction fetching and execution.

A memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, it may directly invoke the instructions or the data from the memory. This avoids repeated access, reduces waiting time of the processor 310, and improves system efficiency.

In some embodiments, the processor 310 may include one or more interfaces. The interface may include an inter-integrated circuit (inter-integrated circuit, 12C) interface, an inter-integrated circuit sound (inter-integrated circuit sound, 12S) interface, a pulse code modulation (pulse code modulation. PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, a universal serial bus (universal serial bus, USB) port, and/or the like.

It can be understood that an interface connection relationship between modules illustrated in this embodiment is merely an illustrative description, and does not constitute a limitation on a structure of the electronic device 100. In some other embodiments, the electronic device 100 may alternatively use an interface connection manner different from that in the foregoing embodiment, or use a combination of a plurality of interface connection manners.

The charge management module 340 is configured to receive a charging input from a charger. The charger may be a wireless charger or a wired charger. In some wired charging embodiments, the charge management module 340 may receive a charging input from the wired charger through the USB interface 330. In some wireless charging embodiments, the charge management module 340 may receive a wireless charging input through a wireless charging coil of the electronic device 100. At the same time when the charge management module 340 charges the battery 342, the power management module 341 may be used to supply power to the electronic device.

The power management module 341 is configured to connect to the battery 342, the charge management module 340, and the processor 310. The power management module 341 receives an input of the battery 342 and/or the charging management module 340, and supplies power to the processor 310, the internal memory 320, an external memory, the display 391, the wireless communications module 360, and the like. The power management module 341 may be further configured to monitor parameters such as battery capacity, a battery cycle quantity, and a battery health status (leakage and impedance). In some other embodiments, the power management module 341 may also be provided in the processor 310. In some other embodiments, the power management module 341 and the charge management module 340 may also be provided in a same device.

A wireless communication function of the electronic device 100 may be implemented through the antenna 1, the antenna 2, the mobile communication module 350, the wireless communication module 360, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 350 may provide a solution, applied to the electronic device 100, to wireless communication including 2G, 3G, 4G, 5G, and the like. The mobile communication module 350 may include at least one filter, a switch, a power amplifier, a low noise amplifier (low noise amplifier, LNA), and the like. The mobile communication module 350 may receive an electromagnetic wave through the antenna 1, perform processing such as filtering and amplification on the received electromagnetic wave, and transmit a processed electromagnetic wave to the modem processor for demodulation. The mobile communication module 350 may further amplify a signal modulated by the modem processor, and convert the signal into an electromagnetic wave by using the antenna 1 for radiation. In some embodiments, at least some function modules of the mobile communication module 350 may be disposed in the processor 310. In some embodiments, at least some function modules of the mobile communication module 350 may be disposed in the same device as at least some modules of the processor 310.

The modem processor may include a modulator and a demodulator. The modulator is configured to modulate to-be-sent low frequency baseband signals into medium and high frequency signals. The demodulator is configured to demodulate a received electromagnetic wave signal into a low frequency baseband signal. Then the demodulator transmits the demodulated low frequency baseband signal to the baseband processor for processing. The low frequency baseband signal is processed by the baseband processor and then passed to the application processor. The application processor outputs a sound signal through an audio device (not limited to the speaker 370A, the receiver 370B, or the like), or displays an image or a video through the display 391. In some embodiments, the modem processor may be a separate device. In some other embodiments, the modem processor may be independent of the processor 310, and provided in a same device as the mobile communication module 350 or another function module.

The wireless communication module 360 may provide a wireless communication solution that is applied to the electronic device 100, and that includes a wireless local area network (wireless local area networks. WLAN) (for example, a wireless fidelity (wireless fidelity, Wi-Fi) network). Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 360 may be one or more components integrating at least one communication processing module. The wireless communication module 360 receives an electromagnetic wave through the antenna 2, performs frequency modulation and filtering processing on the electromagnetic wave signal, and sends a processed signal to the processor 310. The wireless communication module 360 may further receive a to-be-sent signal from the processor 310, perform frequency modulation and amplification on the signal, and convert the signal into an electromagnetic wave for radiation through the antenna 2.

In some embodiments, in the electronic device 100, the antenna 1 and the mobile communication module 350 are coupled, and the antenna 2 and the wireless communication module 360 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access. CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 391, the application processor, and the like. The GPU is a microprocessor for image processing, and is connected to the display 391 and the application processor. The GPU is configured to perform mathematical and geometric calculation, and render an image. The processor 310 may include one or more GPUs, which execute program instructions to generate or change display information.

The display 391 is configured to display an image, a video, and the like. The display 391 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like.

The internal memory 320 may be configured to store computer-executable program code. The executable program code includes instructions. The processor 310 performs various function applications and data processing of the electronic device 100 by running the instructions stored in the internal memory 320. The internal memory 320 may include a program storage area and a data storage area. The program storage area may store an operating system, an application required for at least one function (such as a sound play function and an image play function), and the like. The data storage area may store data (such as audio data and a phone book) created based on use of the electronic device 100, and the like. In addition, the internal memory 320 may include a high-speed random access memory, and may further include a non-volatile memory, for example, at least one magnetic disk storage device, a flash memory device, and a universal flash storage (universal flash storage, UFS).

The electronic device 100 may implement an audio function such as music play and recording through the audio processing module 370, the speaker 370A, the receiver 370B, the microphone 370C, the application processor, and the like.

The audio processing module 370 is configured to convert digital audio information into an analog audio signal output, and is also configured to convert an analog audio input into a digital audio signal. The processing audio module 370 may be further configured to code and decode an audio signal. In some embodiments, the audio processing module 370 may be disposed in the processor 310, or some function modules in the audio processing module 370 are disposed in the processor 310.

The speaker 370A, also referred to as a "loudspeaker", is configured to convert an audio electrical signal into a sound signal. The electronic device 100 may listen to music or answer a call in a hands-free mode through the speaker 370A. At least one speaker 370A may be disposed in the electronic device 100. In some other embodiments, in order to improve a sound play effect, two, three, or more speakers 370A may alternatively be disposed in the electronic device 100.

The receiver 370B, also referred to as an "earpiece", is configured to convert an audio electrical signal into a sound signal. When a call is answered or a voice message is received through the electronic device 100, the receiver 370B may be put close to a human ear to listen to a voice.

The microphone 370C, also referred to as a "mike" or a "mic", is configured to convert a sound signal into an electrical signal. When making a call or sending a voice message or needing to trigger the electronic device 100 to perform some functions by using a voice assistant, a user may make a sound by moving a human mouth close to the microphone 370C, to input a sound signal to the microphone 370C. At least two microphones 370C such as a microphone 370C1 and a microphone 370C2 may be disposed in the electronic device 100, to implement a noise reduction function, in addition to collecting a sound signal. In some other embodiments, three, four, or more microphones 370C may alternatively be disposed in the electronic device 100, to collect a sound signal, implement noise reduction, and identify a sound source, so as to implement a directional recording function and the like.

It should be understood that the speaker 370A and the receiver 370B belong to audio output modules of the electronic device 100, and the microphone 370C belongs to audio collection modules of the electronic device 100. With reference to FIG. 1 and FIG. 2, the speaker 370A may be the speaker A1, the receiver 370B may be the earpiece A2, and the microphone 370C may be the microphone B1, the microphone B2, or the microphone B3.

The button 390 includes a power button, a volume button, and the like. The button 390 may be a mechanical button, or may be a touch-sensitive button. The electronic device 100 may receive a button input, and generate a button signal input related to user setting and function control of the electronic device 100.

The following describes in detail an audio module detection method provided in an embodiment of this application by using the electronic device 100 shown in FIG. 1 an example.

First, before the audio module detection method provided in this embodiment of this application is performed, there is a need to obtain a set of calibration energy data capable of indicating that holes of a detected audio module of the electronic device 100 are not blocked, and store the set of calibration energy data into the electronic device 100. In this way, when performing the audio module detection method provided in this embodiment of this application, the electronic device 100 invokes the calibration energy data to determine a hole blocking status of the detected audio module, so as to assist in implementing an audio hole blocking detection function. It should be understood that the detected audio module may be the speaker A1, the earpiece A2, the microphone B1, or the microphone B2 in FIG. 1. Therefore, there is a need to obtain the following four sets of calibration energy data: calibration energy data indicating that holes of the speaker A1 are not blocked, calibration energy data indicating that holes of the earpiece A2 are not blocked, calibration energy data indicating that holes of the microphone B1 are not blocked, and calibration energy data indicating that holes of the microphone B2 are not blocked. The following describes a detection manner and a detection process of each group of calibration energy data.

In some embodiments of this application, before delivery of the electronic device 100 (in this case, holes of neither of the speaker A1 and the microphone B1 are blocked), the electronic device 100 controls the speaker A1 to output test audio (namely, second audio) respectively at X volume levels (at least two preset volume levels divided for the speaker A1). For each volume level, the microphone B1 is used to collect the test audio respectively at Y level gains (at least two first preset level gains divided for the microphone B1), to obtain X*Y pieces of calibration energy data.

The test audio is audio within a human hearing range of 20 Hz to 20 KHz. For example, the test audio may be audio in a frequency band of 300 Hz to 700 Hz.

The volume level represents a level at which volume of the audio is located. X volume levels represent X different volume values, and X is a positive integer greater than 1, such as 5, 7, or 10. The volume level may be positively correlated with the volume, for example, a volume level 1 is less than a volume level 2, the volume level 1 represents 50 decibels, and the volume level 2 represents 70 decibels. The volume level may alternatively be negatively correlated with the volume, for example, a volume level 3 is greater than a volume level 2, the volume level 3 represents 60 decibels, and the volume level 2 represents 70 decibels. The level gain represents a magnification of collected audio. Y level gains represent Y different magnifications, and Y is a positive integer greater than 1, such as 3, 8, or 10. The level gain may be positively or negatively correlated with the magnification. This is not specifically limit in this embodiment of this application.

The following describes obtained calibration energy data with reference to Table 1 by using five volume levels (namely, X=5) and five level gains (namely, Y=5) as an example.

TABLE 1

Detection status of calibration energy data obtained through detection on the speaker A1 by using the microphone B1

| Volume level | Level gain | | | | |
|---|---|---|---|---|---|
| | $Y_1$ | $Y_2$ | $Y_3$ | $Y_4$ | $Y_5$ |
| $X_1$ | $ZB_{11}$ | $ZB_{12}$ | $ZB_{13}$ | $ZB_{14}$ | $ZB_{15}$ |
| $X_2$ | $ZB_{21}$ | $ZB_{22}$ | $ZB_{23}$ | $ZB_{24}$ | $ZB_{25}$ |
| $X_3$ | $ZB_{31}$ | $ZB_{32}$ | $ZB_{33}$ | $ZB_{34}$ | $ZB_{35}$ |
| $X_4$ | $ZB_{41}$ | $ZB_{42}$ | $ZB_{43}$ | $ZB_{44}$ | $ZB_{45}$ |
| $X_5$ | $ZB_{51}$ | $ZB_{52}$ | $ZB_{53}$ | $ZB_{54}$ | $ZB_{55}$ |

$X_i$ represents the $i^{th}$ volume level among the five volume levels, $1 \leq i \leq 5$, and i is a positive integer. $Y_j$ represents the $j^{th}$ level gain among the five level gains, $1 \leq j \leq 5$, and j is a positive integer. $ZB_{ij}$ represents volume collected by the microphone B1 without blocked holes at $Y_j$ when the speaker A1 without blocked holes outputs the test audio at $X_i$. In this embodiment of this application, energy data is used to indicate volume of collected audio, which is measured in decibel milliwatts (dBm), and is usually a negative value. For example, the energy data may be −9 dBm or −20 dBm. Volume of audio indicated by −9 dBm is greater than that indicated by −20 dBm.

It should be understood that, before delivery of the electronic device 100, holes of neither of the speaker A1 and the microphone B1 are blocked. Therefore, the calibration energy data shown in Table 1 may indicate that holes of the microphone B1 are not blocked, and may also indicate that holes of the speaker A1 are not blocked. Based on this, Table 1 may be invoked in an embodiment in which the detected audio module is the microphone B1 or the speaker A1.

In a same implementation, before delivery of the electronic device 100, the electronic device 100 controls the speaker A1 to output the test audio respectively at X volume levels. For each volume level, the microphone B2 is used to collect the test audio respectively at y level gains (at least two second preset level gains divided for the microphone B2), to obtain X*y pieces of calibration energy data. y is a positive integer greater than 1. The following is described with reference to Table 2 by using five volume levels (namely, X=5) and five level gains (namely, Y=5) as an example.

TABLE 2

Detection status of calibration energy data obtained through detection on the speaker A1 by using the microphone B2

| Volume level | Level gain | | | | |
|---|---|---|---|---|---|
| | $y_1$ | $y_2$ | $y_3$ | $y_4$ | $y_5$ |
| $X_1$ | $ZF_{11}$ | $ZF_{12}$ | $ZF_{13}$ | $ZF_{14}$ | $ZF_{15}$ |
| $X_2$ | $ZF_{21}$ | $ZF_{22}$ | $ZF_{23}$ | $ZF_{24}$ | $ZF_{25}$ |
| $X_3$ | $ZF_{31}$ | $ZF_{32}$ | $ZF_{33}$ | $ZF_{34}$ | $ZF_{35}$ |
| $X_4$ | $ZF_{41}$ | $ZF_{42}$ | $ZF_{43}$ | $ZF_{44}$ | $ZF_{45}$ |
| $X_5$ | $ZF_{51}$ | $ZF_{52}$ | $ZF_{53}$ | $ZF_{54}$ | $ZF_{55}$ |

$X_i$ represents the $i^{th}$ volume level among the five volume levels, $1 \le i \le 5$, and i is a positive integer. $y_j$ represents the $j^{th}$ level gain among the five level gains, $1 \le j \le 5$, and j is a positive integer. $ZF_{ij}$ represents energy data collected by the microphone B2 without blocked holes at $y_j$ when the speaker A1 without blocked holes outputs the test audio at $X_i$.

It should be understood that, before delivery of the electronic device 100, holes of neither of the speaker A1 and the microphone B2 are blocked. Therefore, the calibration energy data shown in Table 2 may indicate that holes of the microphone B2 are not blocked, and may also indicate that holes of the speaker A1 are not blocked. Based on this, Table 2 may be invoked in an embodiment in which the detected audio module is the microphone B2 or the speaker A1.

In a same implementation, before delivery of the electronic device 100, the electronic device 100 controls the earpiece A2 to output the test audio respectively at M volume levels (at least two preset volume levels divided for the earpiece A2). For each volume level, the microphone B1 is used to collect the test audio respectively at Y level gains, to obtain M*Y pieces of calibration energy data. M is a positive integer greater than 1. The following is described with reference to Table 3 by using five volume levels (namely, M=5) and five level gains (namely, Y=5) as an example.

TABLE 3

Detection status of calibration energy data obtained through detection on the earpiece A2 by using the microphone B1

| Volume level | Level gain | | | | |
|---|---|---|---|---|---|
| | $Y_1$ | $Y_2$ | $Y_3$ | $Y_4$ | $Y_5$ |
| $M_1$ | $ZZB_{11}$ | $ZZB_{12}$ | $ZZB_{13}$ | $ZZB_{14}$ | $ZZB_{15}$ |
| $M_2$ | $ZZB_{21}$ | $ZZB_{22}$ | $ZZB_{23}$ | $ZZB_{24}$ | $ZZB_{25}$ |
| $M_3$ | $ZZB_{31}$ | $ZZB_{32}$ | $ZZB_{33}$ | $ZZB_{34}$ | $ZZB_{35}$ |
| $M_4$ | $ZZB_{41}$ | $ZZB_{42}$ | $ZZB_{43}$ | $ZZB_{44}$ | $ZZB_{45}$ |
| $M_5$ | $ZZB_{51}$ | $ZZB_{52}$ | $ZZB_{53}$ | $ZZB_{54}$ | $ZZB_{55}$ |

$M_i$ represents the $i^{th}$ volume level among the five level gains, $1 \le i \le 5$, and i is a positive integer. $Y_j$ represents the $j^{th}$ level gain among the five level gains, $1 \le j \le 5$, and j is a positive integer. $ZZB_{ij}$ represents energy data collected by the microphone B1 at $Y_j$ when the earpiece A2 outputs the test audio at $M_i$.

It should be understood that, before delivery of the electronic device 100, holes of neither of the earpiece A2 and the microphone B1 are blocked. Therefore, the calibration energy data shown in Table 3 may indicate that holes of the microphone B1 are not blocked, and may also indicate that holes of the earpiece A2 are not blocked. Based on this, Table 3 may be invoked in an embodiment in which the detected audio module is the microphone B1 or the earpiece A2.

In a same implementation, before delivery of the electronic device 100, the electronic device 100 controls the earpiece A2 to output the test audio respectively at M volume levels. For each volume level, the microphone B2 is used to collect the test audio respectively at y level gains, to obtain M*y pieces of calibration energy data. The following is described with reference to Table 3 by using five volume levels (namely, M=5) and five level gains (namely, y=5) as an example.

TABLE 4

Detection status of calibration energy data obtained through detection on the earpiece A2 by using the microphone B2

| Volume level | Level gain | | | | |
|---|---|---|---|---|---|
| | $y_1$ | $y_2$ | $y_3$ | $y_4$ | $y_5$ |
| $M_1$ | $ZZF_{11}$ | $ZZF_{12}$ | $ZZF_{13}$ | $ZZF_{14}$ | $ZZF_{15}$ |
| $M_2$ | $ZZF_{21}$ | $ZZF_{22}$ | $ZZF_{23}$ | $ZZF_{24}$ | $ZZF_{25}$ |
| $M_3$ | $ZZF_{31}$ | $ZZF_{32}$ | $ZZF_{33}$ | $ZZF_{34}$ | $ZZF_{35}$ |
| $M_4$ | $ZZF_{41}$ | $ZZF_{42}$ | $ZZF_{43}$ | $ZZF_{44}$ | $ZZF_{45}$ |
| $M_5$ | $ZZF_{51}$ | $ZZF_{52}$ | $ZZF_{53}$ | $ZZF_{54}$ | $ZZF_{55}$ |

$M_i$ represents the $i^{th}$ volume level among the five level gains, $1 \le i \le 5$, and i is a positive integer. $y_j$ represents the $j^{th}$ level gain among the five level gains, $1 \le j \le 5$, and j is a positive integer. $ZZF_{ij}$ represents energy data collected by the microphone B2 at $y_j$ when the earpiece A2 outputs the test audio at $M_i$.

It should be understood that, before delivery of the electronic device 100, holes of neither of the earpiece A2 and the microphone B2 are blocked. Therefore, the calibration energy data shown in Table 4 may indicate that holes of the microphone B2 are not blocked, and may also indicate that holes of the earpiece A2 are not blocked. Based on this, Table 4 may be invoked in an embodiment in which the detected audio module is the microphone B2 or the earpiece A2.

In some other embodiments of this application, the data in Table 1 to Table 4 may alternatively be obtained after delivery of the electronic device 100. For example, the data is obtained through detection when the user starts an initial activation process of the electronic device 100. For another example, the data is obtained through detection in a period of time (for example, one week, three weeks, or one month) after the initial activation by the user.

In some other embodiments of this application, the data in Table 1 to Table 4 may alternatively be obtained by testing another test electronic device of a same type as the electronic device 100, and is stored in a server or the electronic device 100, so that the data can be obtained by the electronic device 100. During a specific implementation process, when the data in Table 1 to Table 4 is stored in the server, the electronic device 100 may obtain the data in Table 1 to Table 4 from the server based on a unique identifier such as a model of the electronic device 100.

After obtaining the data in Table 1 to Table 4, the electronic device 100 may be triggered to enable the audio hole blocking detection function based on the following application scenario (1) and application scenario (2). After the audio hole blocking detection function is enabled through the triggering, the audio hole blocking detection method provided in this embodiment of this application may be performed, to detect whether holes of the audio collection module or the audio output module of the electronic device 100 are blocked.

Application Scenario (1):

The electronic device 100 enables the audio hole blocking detection function in response to the user's enable operation on an enabling control.

Figure 4A:
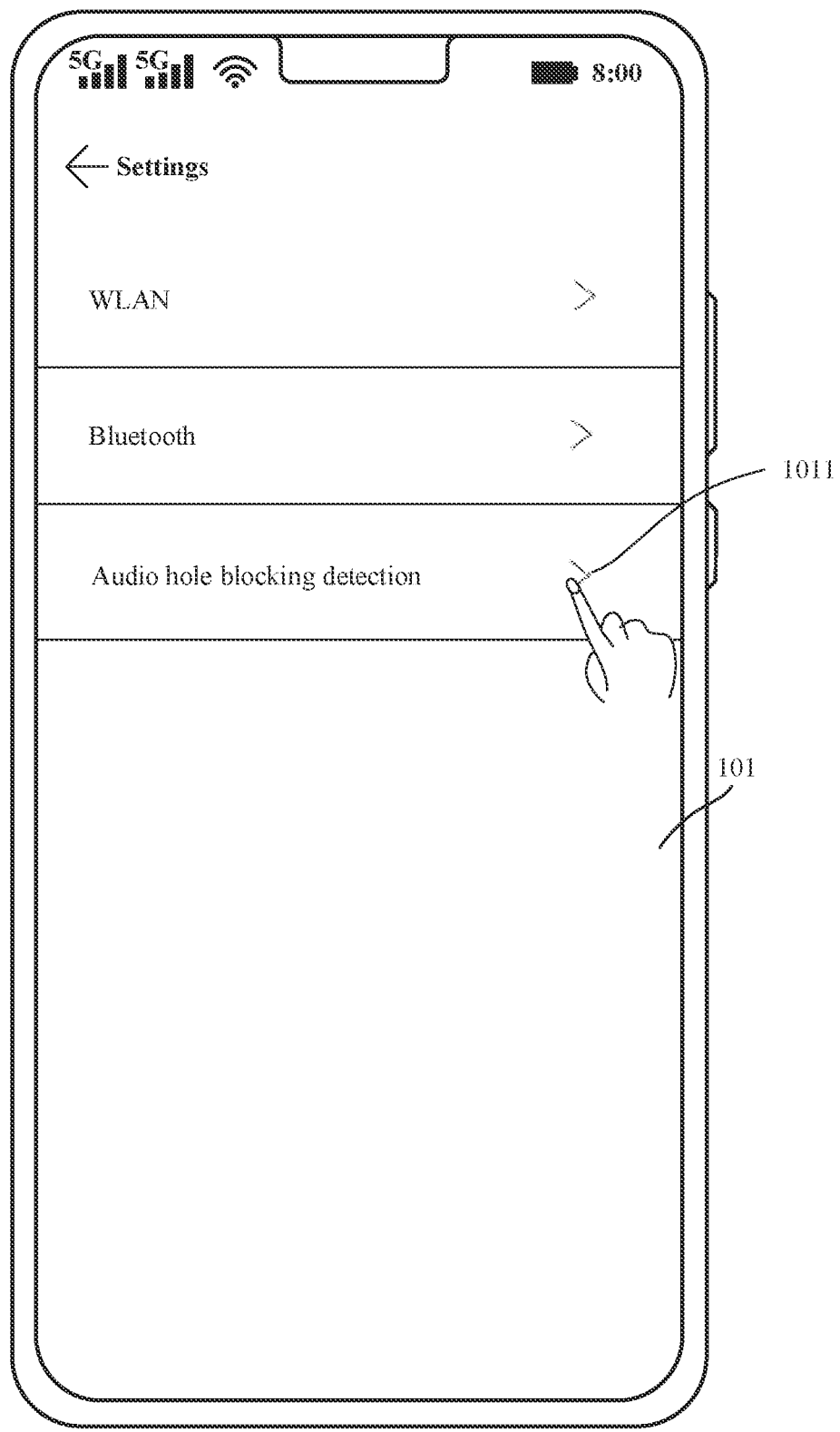
FIG. 4(a), FIG. 4(b), and FIG. 4(c) are a schematic diagram 1 of a scenario of enabling an audio hole blocking detection function according to an embodiment of this application.
Figure 4B:
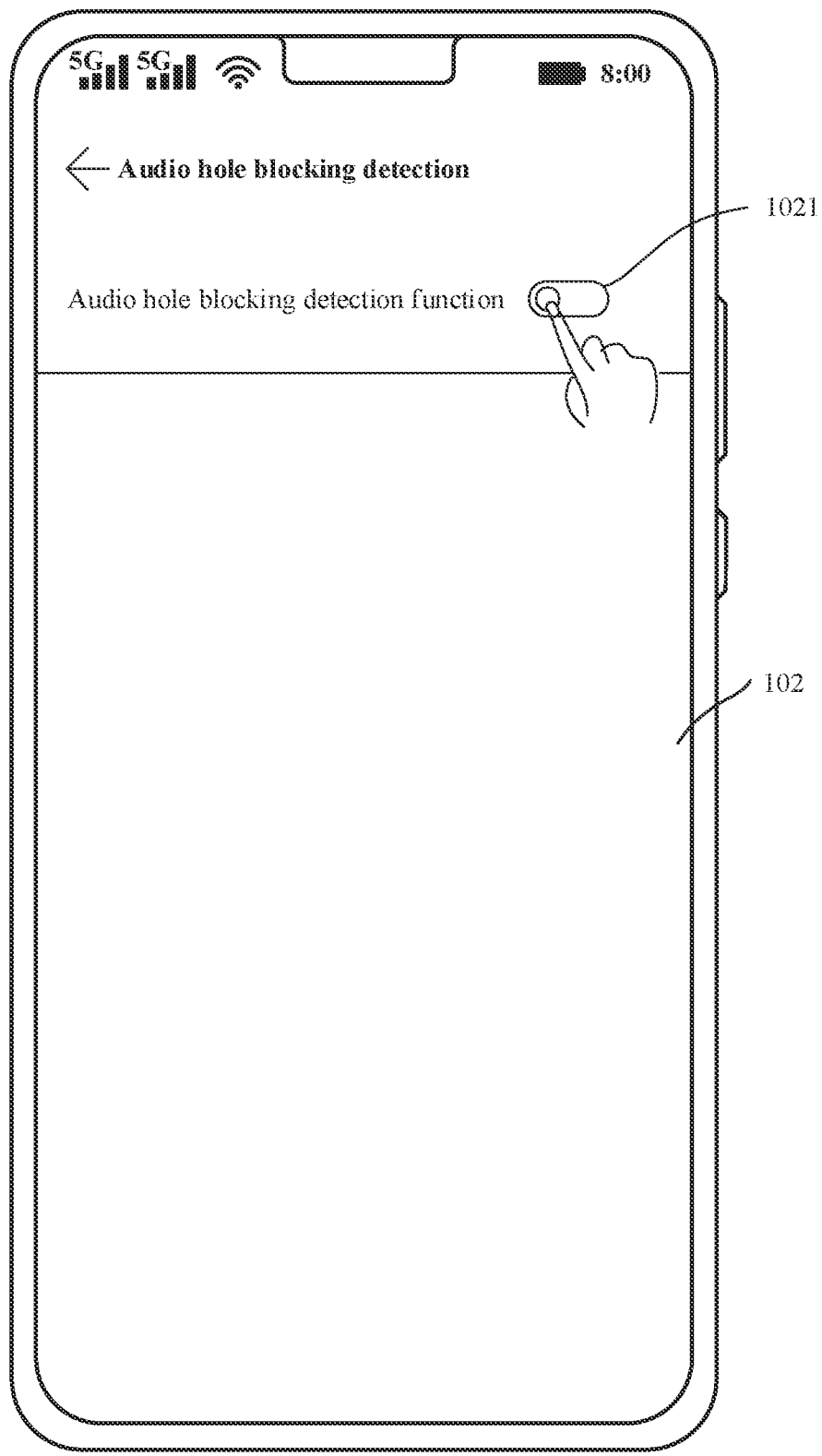
Figure 4C:
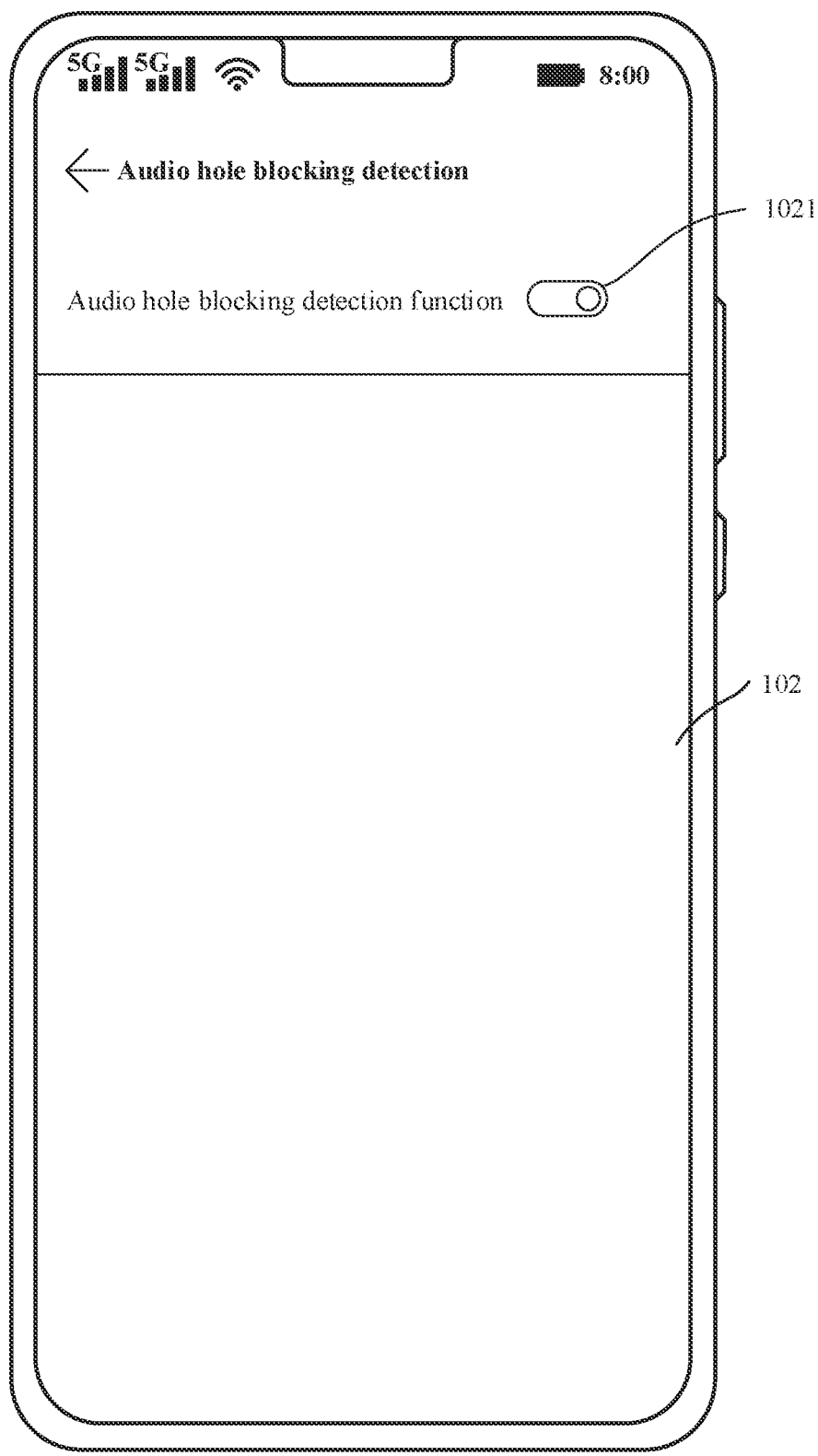

For example, as shown in FIG. 4(*a*), the electronic device 100 has a setting interface 101, and the setting interface 101 includes a function option 1011 of "Audio hole blocking detection". In response to the user's tap operation on the function option 1011 of "Audio hole blocking detection", the electronic device 100 displays an audio hole blocking detection interface 102 shown in FIG. 4(*b*). As shown in FIG. 4(*b*), the audio hole blocking detection interface 102 includes a switch control 1021 used for enabling the audio hole blocking detection function. In response to the user's enable operation on the switch control 1021, the electronic device 100 displays the audio hole blocking detection interface 102 shown in FIG. 4(*c*), and enables the audio hole blocking detection function.

Application Scenario (2):

The electronic device 100 enables the audio hole blocking detection function based on a preset period. The preset period is a time interval at which the audio hole blocking detection function is enabled every time. For example, the preset period may be 10 days, one month, or three months. That the preset period is 10 days is used as an example. It is assumed that the electronic device 100 enables the audio hole blocking detection function at a time 1, enables the audio hole blocking detection function again at a time 2 that is 10 days later, and enables the audio hole blocking detection function again at a time 3 that is 10 days after the time 2, and so on.

Figure 5A:
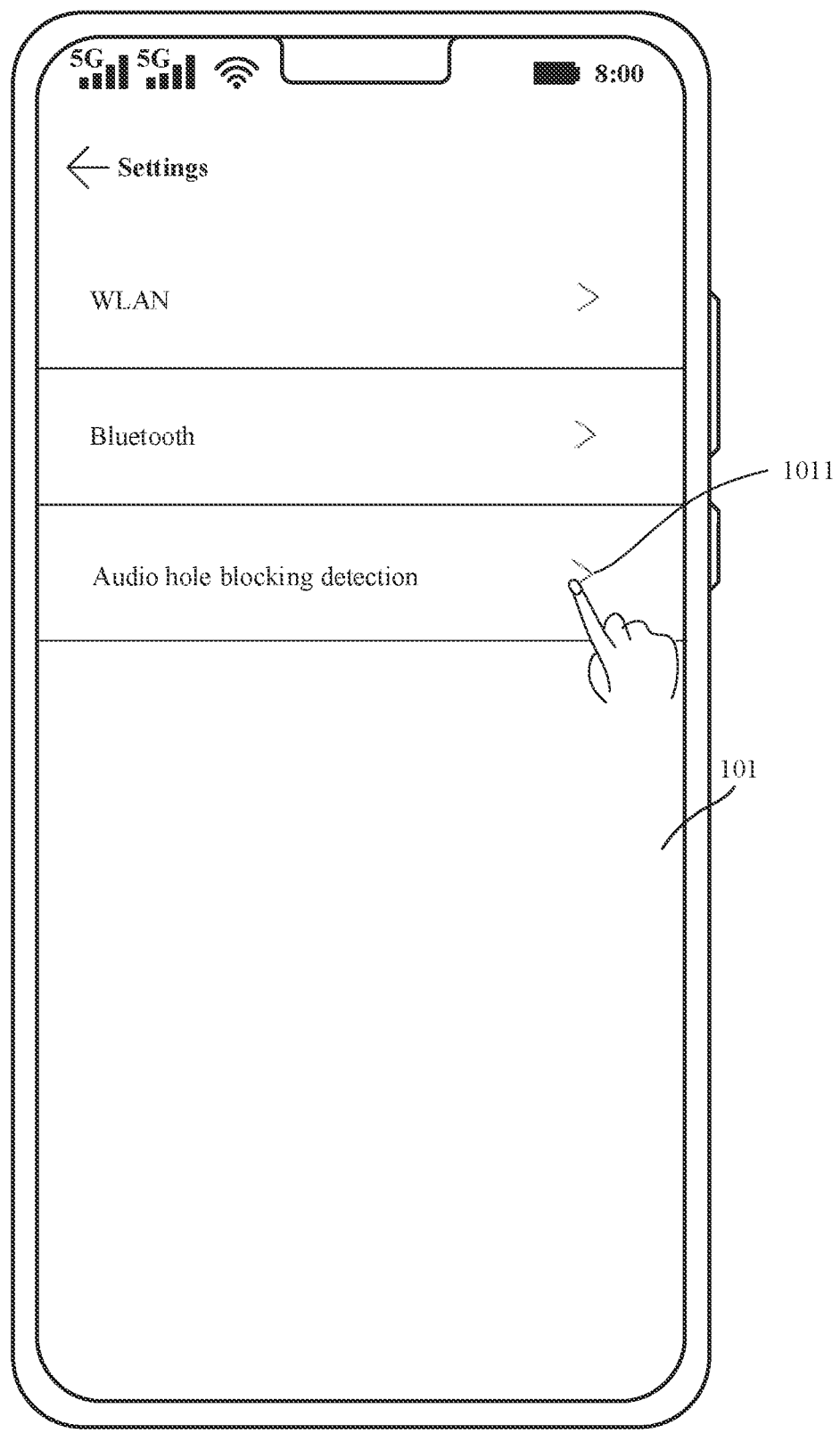
FIG. 5(a).
Figure 5B:
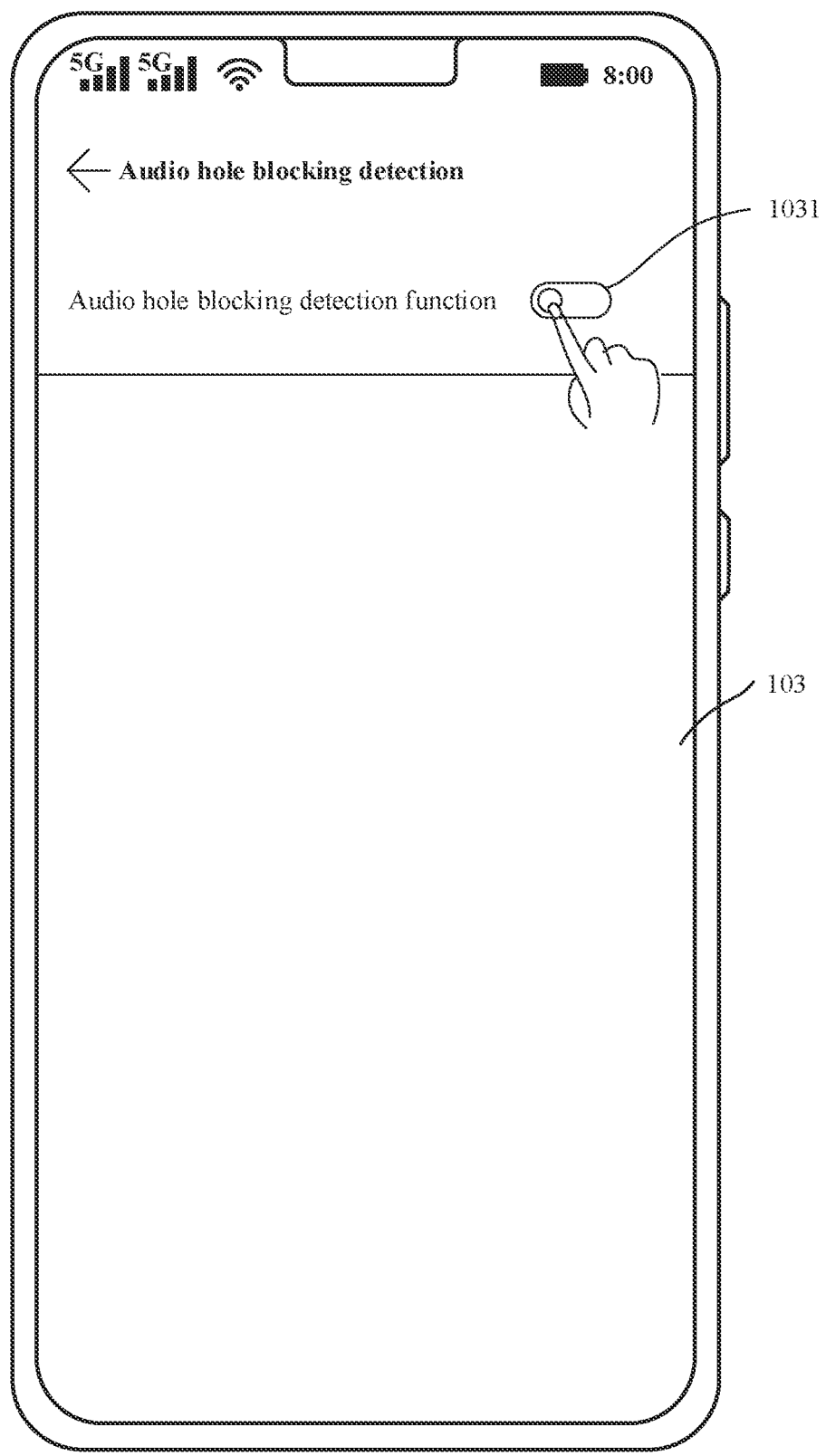
FIG. 5(b), and FIG. 5(c) are a schematic diagram 2 of a scenario of enabling an audio hole blocking detection function according to an embodiment of this application.
Figure 5C:
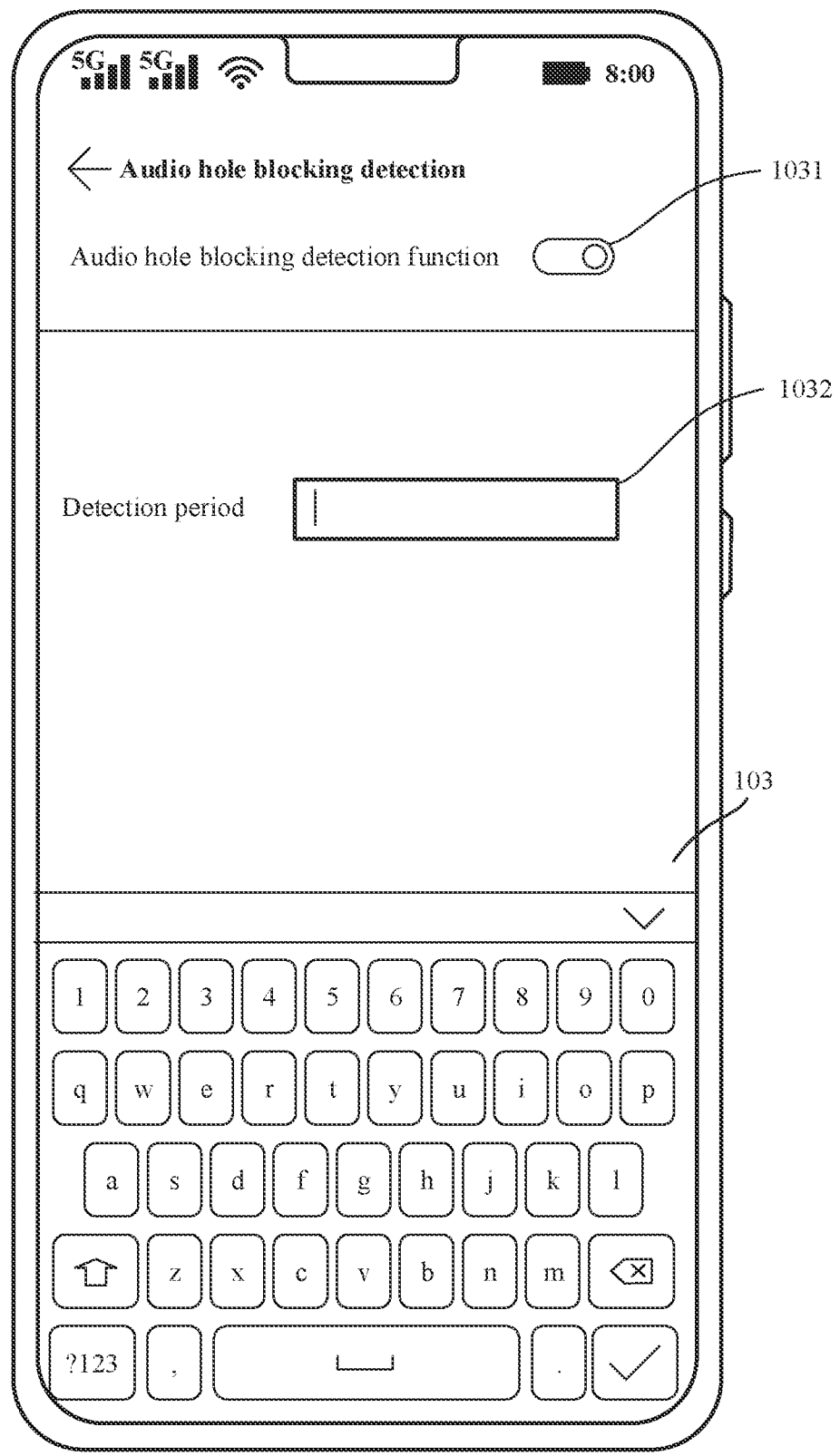

For example, the preset period may be set in the audio hole blocking detection interface 103 shown in FIG. 5(*c*).

As shown in FIG. 5(*a*), the electronic device 100 has a setting interface 101, and the setting interface 101 includes a function option 1011 of "Audio hole blocking detection". In response to the user's tap operation on the function option 1011 of "Audio hole blocking detection", the electronic device 100 displays an audio hole blocking detection interface 103 shown in FIG. 5(*b*). As shown in FIG. 5(*b*), the audio hole blocking detection interface 103 includes a switch control 1031 used for enabling the audio hole blocking detection function. In response to the user's enable operation on the switch control 1031, the electronic device 100 displays the audio hole blocking detection interface 103 shown in FIG. 5(*c*). As shown in FIG. 5(*c*), the audio hole blocking detection interface 103 includes an input field 1032 used for obtaining the preset period. In response to the user's input operation on the input field 1032, the electronic device 100 obtains the preset period, and enables the audio hole blocking detection function.

After the electronic device 100 is triggered to enable the audio hole blocking detection function, the electronic device 100 performs the audio module detection method provided in the embodiments of this application. The audio module detection method provided in the embodiments of this application vary with the detected audio module, and is described separately in the following four cases.

Embodiment 1. The Detected Audio Module is the Speaker A1 in FIG. 1

Figure 6:
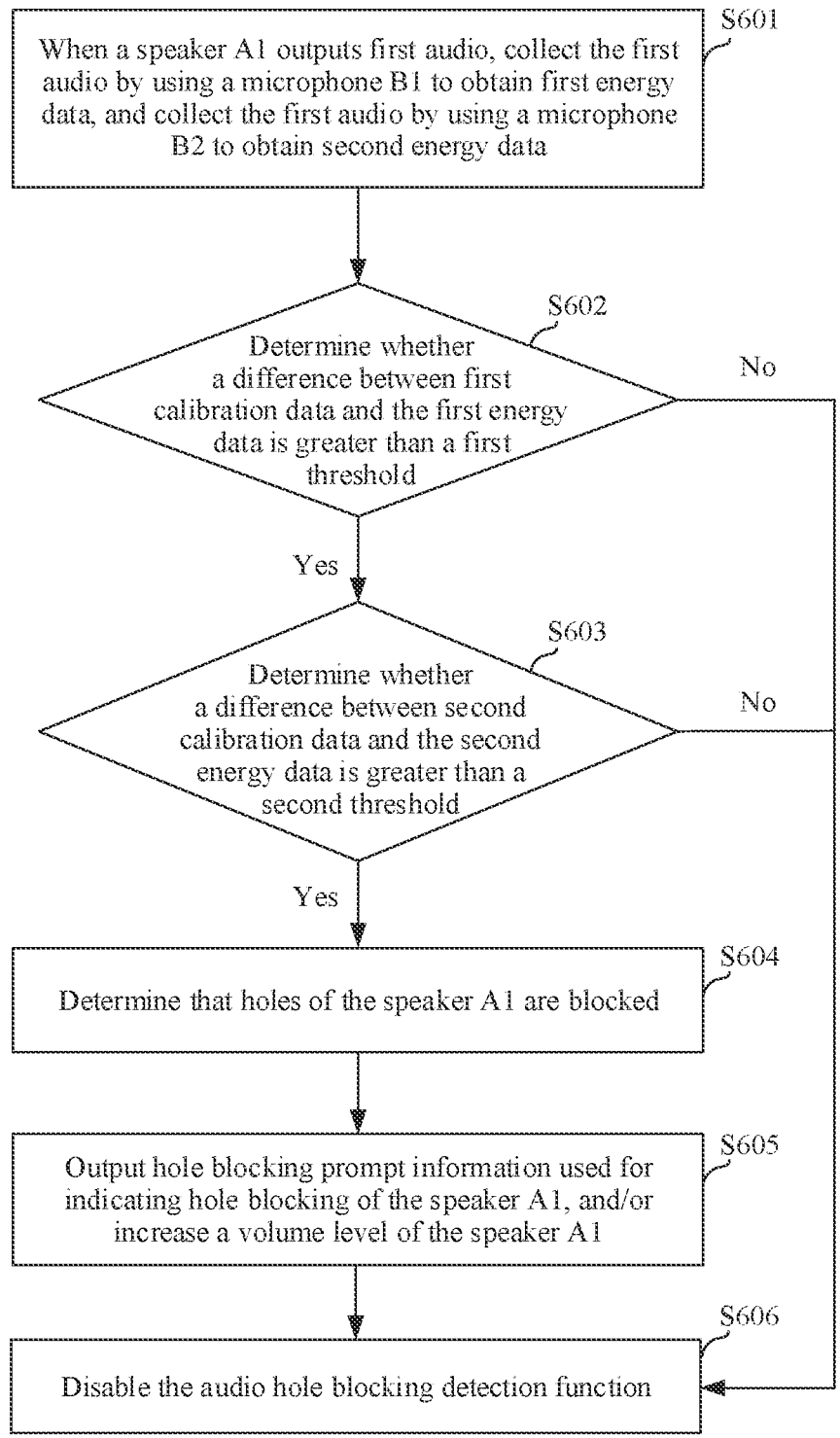
FIG. 6 is a schematic flowchart of an audio module detection method according to an embodiment of this application.

For example, as shown in FIG. 6, when the detected audio module is the speaker A1 in FIG. 1, the audio module detection method may be implemented by using the following S601 to S606.

S601. When the speaker A1 outputs first audio, collect the first audio by using a microphone B1 to obtain first energy data, and collect the first audio by using a microphone B2 to obtain second energy data.

For a specific definition of the first audio, refer to the test audio. Details are not described herein again.

The first audio may be audio that is the same as the test audio and that the electronic device controls the speaker A1 to output in real time. It should be noted that the test audio may be any audio, such as music or a story.

The first audio may alternatively be audio that is different from the test audio and that the electronic device controls the speaker A1 to output in real time after the foregoing audio hole blocking detection function is triggered. In this case, the first audio may be any audio, such as music or a story. The first audio may even be audio selected by a user according to a user's preference.

The first audio may alternatively be audio output by the speaker A1 during routine use of the speaker A1 by the user after the audio hole blocking detection function is enabled through triggering. For example, after the user taps, at a time 1, the control 1021 shown in FIG. 4(*b*), the user taps a music player to play audio 2 at a time 2 after the time 1, and the music player outputs the audio 2 by using the speaker A1. In this case, the audio 2 may be the first audio. For another example, after the user taps the control 1021 shown in FIG. 4(*b*) at the time 1, the electronic device 100 outputs an incoming call ringtone at a time 3 after the time 1 due to an incoming call from another electronic device. In addition to the audio 2 and the incoming call ringtone output by the speaker A1, the first audio may be further an outgoing call ringtone played by using the speaker A1, a voice message (for example, a voice of social software such as WeChat™ or QQ™) played by using the speaker A1, audio output by the speaker A1 during a call (such as a voice call or a video call of social software such as WeChat™ or QQ™), or audio obtained by playing a media resource (for example, a media resource such as a game, a video, or music), or the like. It can be learned that implementation of this example ensures that S601 may be performed in a background of the electronic device 100 during routine use of the speaker A1 by the user, without a need to separately enable the speaker A1 to output the first audio.

It should be noted that, when the first audio and the test audio are different, in order to avoid impact of a difference between the first audio and the test audio on the energy data, the first audio and the test audio may be audio in a same frequency band. For example, both the first audio and the test audio may be audio in a frequency band of 300 Hz to 700 Hz. Based on this, in some embodiments, the first audio may be preset audio in a same frequency band as the test audio. In some other embodiments, the first audio may alternatively be obtained by performing frequency band filtered extraction on the audio output by the speaker A1. The filtered extraction means extracting audio frames whose frequency band is in a same frequency band interval as the test audio, and filtering out audio frames that are not in the same frequency range.

The first energy data is used to indicate volume of the first audio collected by the microphone B1, and the second energy data is used to indicate volume of the first audio collected by the microphone B2. The first energy data and the second energy data may be obtained in the following manners:

Manner 1: The first energy data may be volume collected by the microphone B1 at a first level gain when the speaker A1 outputs the first audio at a first volume level.

The second energy data may be volume collected by the microphone B1 at a third level gain when the speaker A1 outputs the first audio at a second volume level.

The first volume level may be any one of X volume levels, and the first level gain may be any one of Y level gains. The second volume level may be any one of X volume levels, and the third level gain is any one of y level gains.

It should be understood that the first volume level and the second volume level may be the same or different. For example, the speaker A1 starts to output the first audio at $X_i$ at a time a, and both the microphone B1 and the microphone B2 collect the first audio at a time b after the time a, to obtain the first energy data and the second energy data. In this case, the first volume level and the second volume level are the same. For example, the speaker A1 starts to output the first audio at $X_1$ at the time a, and the microphone B1 collects the first audio at the time b after the time a, to obtain the first energy data; the speaker A1 starts to output the first audio at $X_2$ at a time c, and the microphone B2 collects the first audio at a time d after the time c, to obtain the second energy data. In this case, the first volume level and the second volume level are different.

Preferably, the first volume level and the second volume level are the same. In this way, the microphone B1 and the microphone B2 may perform collection at the same time, and there is no need to stagger the collection at different times. In addition, the speaker A1 may output the first audio without changing the volume level, and a collection process is simpler.

Moreover, because the microphone B1 and the microphone B2 belong to different functional units, the first level gain and the second level gain may be the same or different.

It should be noted that, in a process of performing the foregoing S601 by the electronic device 100, the first volume level and the second volume level may be any volume levels set by the user for the speaker A1 during routine use of the electronic device 100 when the electronic device 100 triggers enabling of the audio hole blocking detection function of the electronic device 100. For example, the first volume level may be set by the user by using a volume button C in FIG. 1 (corresponding to the button 390 in FIG. 3) or by using a sounds and vibration interface 104 shown in FIG. 7(a) and FIG. 7(b).

Figure 7A:
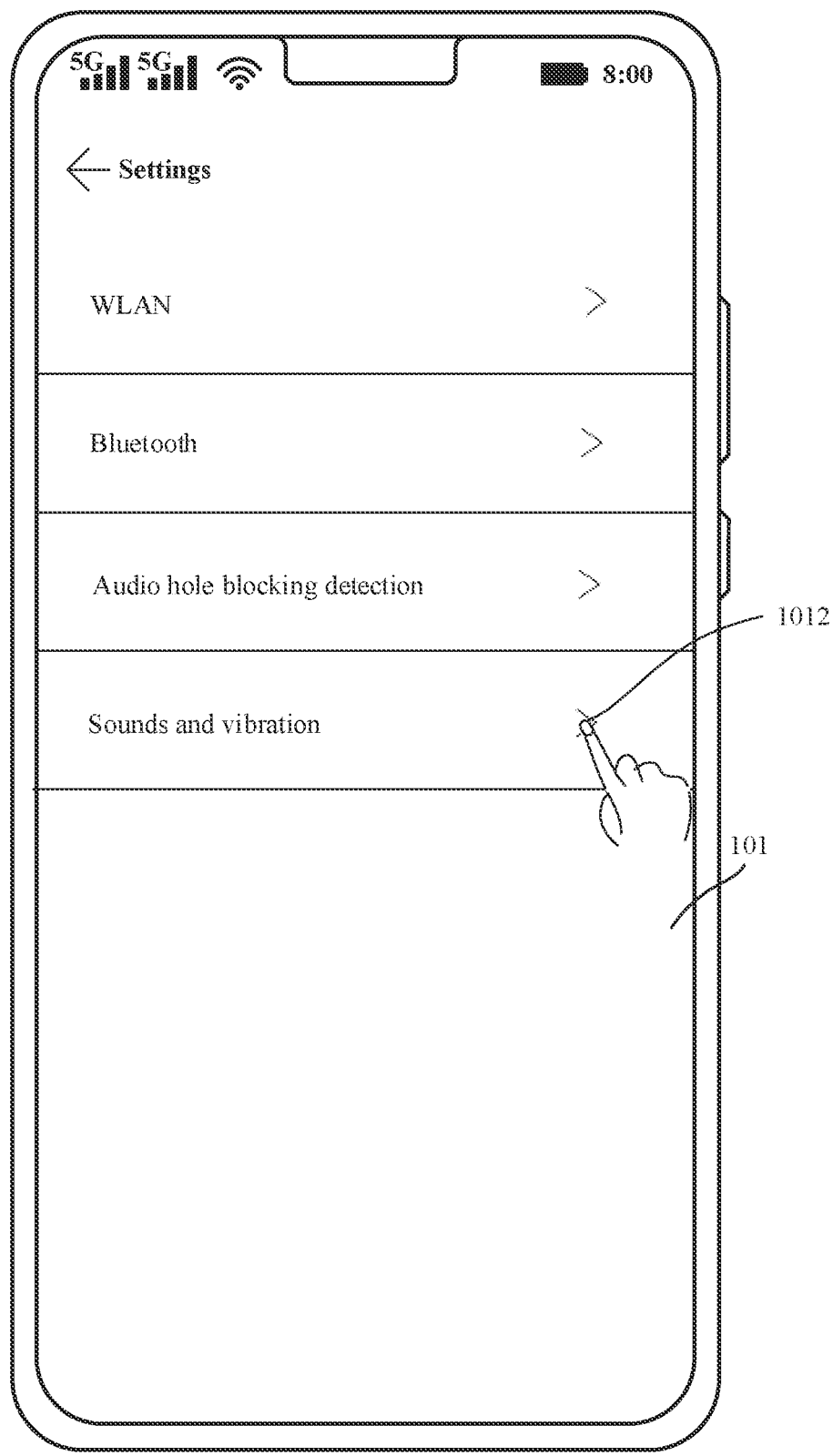
FIG. 7(a) and FIG. 7(b) is a schematic diagram of an interface of setting a level gain and a volume level according to an embodiment of this application.
Figure 7B:
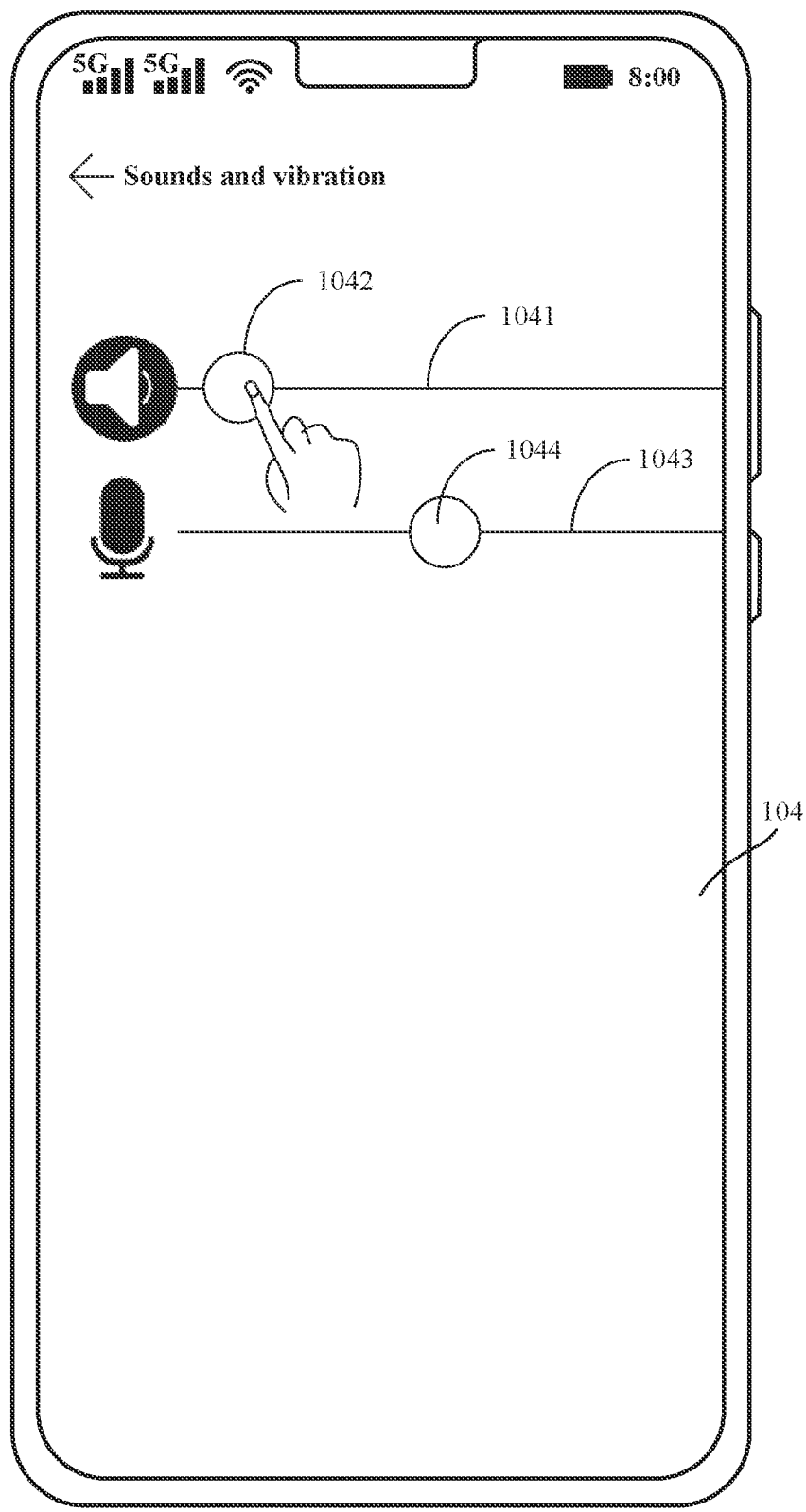

As shown in FIG. 7(a), the electronic device 100 has a setting interface 101, and the setting interface 101 includes a function option 1012 of "Sounds & vibration". In response to the user's tap operation on the function option 1012 of "Sounds & vibration", the electronic device 100 displays the sounds and vibration interface 104 shown in FIG. 7(b). As shown in FIG. 7(b), the sounds and vibration interface 104 includes a slider bar 1041 and a sliding block 1042 used for adjusting the volume level of the speaker A1. The user may adjust the volume level of the speaker A1 by sliding the sliding block 1042 on the slider bar 1041.

Similarly, the first level gain and the second level gain may be any level gains set by the user for the microphone B1 and the microphone B2 during routine use of the electronic device 100 when the audio hole blocking detection function of the electronic device 100 is enabled through triggering. The level gain may be set by the user by using the sound and vibration interface 104 shown in FIG. 7(b) during use of the electronic device 100. As shown in FIG. 7(b), the sounds and vibration interface 104 further includes a slider bar 1043 and a sliding block 1044 used for adjusting the level gain of the microphone B1. The user may adjust the level gain by sliding the sliding block 1044 on the slider bar 1043.

In this way, when the audio hole blocking detection function of the electronic device 100 is enabled through triggering, the speaker A1 outputs the first audio at the first volume level that has been set by the user, and the microphone B1 collects the first energy data at the first level gain that has been set by the user. In addition, the speaker A1 outputs the first audio at the second volume level that has been set by the user, and the microphone B2 collects the second energy data at the first level gain that has been set by the user.

In addition, the first volume level, the second volume level, the first level gain, and the second level gain may alternatively be any values set by the electronic device 100 in the background when the audio hole blocking detection function of the electronic device 100 is enabled. This is not specifically limit in this application.

In the following, detected energy data $B_{ij}$ represents volume collected by the microphone B1 at a level gain $Y_j$ when the speaker A1 outputs the first audio at a volume level $X_i$, and detected energy data $F_{ij}$ represents volume collected by the microphone B2 at a level gain $y_j$ when the speaker A1 outputs the first audio at the volume level Xi. In this case, when the first volume level is $X_1$ and the first level gain is $Y_2$, the first energy data is detected energy data $B_{12}$; when the second volume level is $X_2$ and the second level gain is $y_2$, the second energy data is detected energy data $F_{22}$.

In order to reduce a misdetermining rate, the first energy data and the second energy data may alternatively be obtained in the following Manner 2:

In Manner 2, the first energy data is determined based on a plurality of pieces of first detected energy data obtained by the microphone BL. The plurality of pieces of first detected energy data are volume that has values in one-to-one correspondence with all second level gains and that is obtained by the microphone B1 at the plurality of second level gains when the speaker A1 outputs the first audio at the first volume level.

The second energy data is determined based on a plurality of pieces of second detected energy data obtained by the microphone B2. The plurality of pieces of second detected energy data are volume that has values in one-to-one correspondence with all fourth level gains and that is obtained by the microphone B2 at the plurality of fourth level gains when the speaker A1 outputs the first audio at the second volume level.

For specific implementation of the first volume level and the second volume level, refer to related content in Manner 1. Details are not described herein again.

The plurality of second level gains may be any multiple level gains of the Y level gains, and the plurality of fourth level gains may be any multiple level gains of the y level gains. The following is described by using the plurality of second level gains as an example. For specific implementation of the plurality of fourth level gains, reference may be made thereto.

A quantity of the second level gains may be greater than or equal to 2 and less than or equal to Y (which is a quantity of level gains divided during measurement of calibration energy data for the microphone B1), and the plurality of second level gains may be any values of the Y level gains, and are not necessarily consecutive level gains of the Y level gains. For example, refer to Table 1; the quantity of second level gains may be 2, 3, 4, or 5. The quantity of second level gains is, for example, three, and the second level gain may be $Y_1$, $Y_2$, or $Y_3$, or may be $Y_1$, $Y_3$, or $Y_5$, and so on.

It should be noted that, in a process of performing the foregoing S601 by the electronic device 100, the electronic device 100 may automatically adjust the level gains of the microphone B1 in the background in a manner such as from high to low, from low to high, or at random, so as to obtain the plurality of second level gains. In this way, the microphone B1 may perform collection at a plurality of different second level gains, and obtain corresponding first detected energy data at each second level gain, to obtain the plurality of pieces of first detected energy data.

For example, the first volume level is $X_i$, and the plurality of second level gains are $Y_1$, $Y_3$, and $Y_5$. In this case, the plurality of pieces of first detected energy data are respectively detected energy data $B_{11}$, $B_{13}$, and $B_{15}$. The first energy data is determined based on the detected energy data $B_{11}$, $B_{13}$, and $B_{15}$.

After the plurality of pieces of first detected energy data are obtained, there is a need to further determine the first energy data based on the plurality of pieces of first detected energy data, so as to obtain the first energy data in Manner 2. It should be noted that a manner in which the first energy data is determined based on the plurality of pieces of first detected energy data may include, but is not limited to, weighted average and arithmetic average.

Specific implementation of the second energy data is similar to that of the first energy data. Reference may be made thereto for implementation, and details are not described herein again. Only an example is provided for description. For example, the second volume level is $X_1$, and the plurality of fourth level gains are $y_2$, $y_4$, and $y_5$. In this case, the plurality of pieces of second detected energy data are respectively detected energy data $F_{12}$, $F_{14}$, and $F_{15}$. The second energy data is determined based on the detected energy data $F_{12}$, $F_{14}$, and $F_{15}$.

Figure 8:
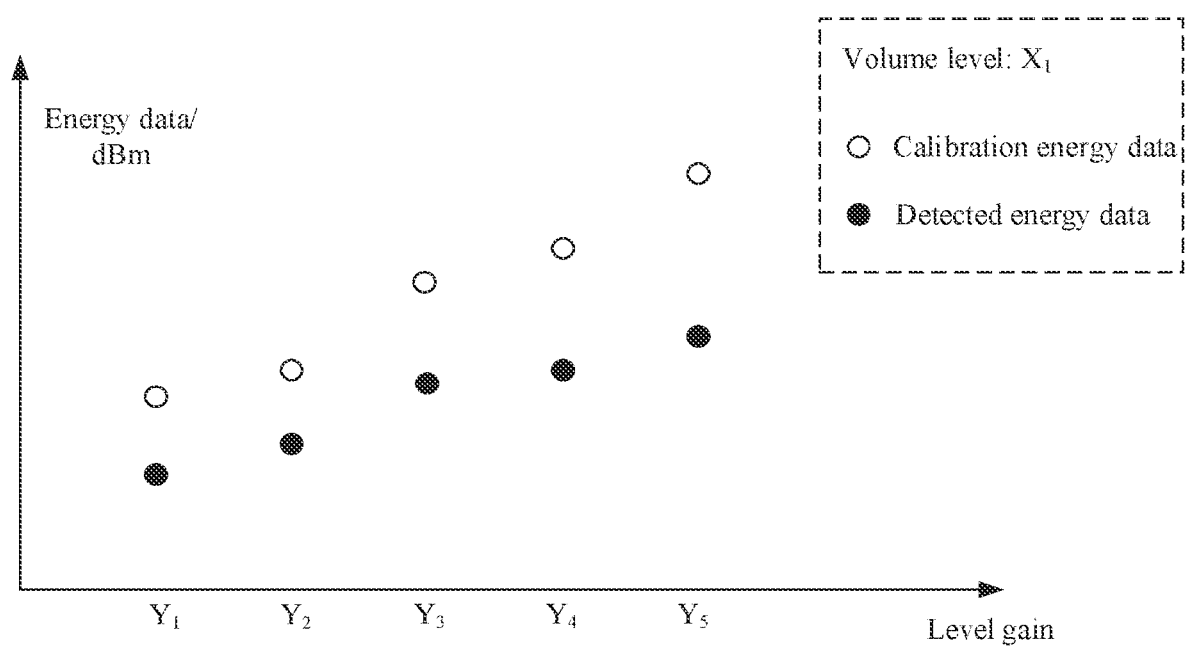
FIG. 8 is a schematic diagram of comparison between calibration energy data and detected energy data according to an embodiment of this application.

The following describes, with reference to FIG. 8 by using the first energy data as an example, a reason why a misdetermining rate can be reduced in Manner 2.

Refer to FIG. 8. Energy data obtained by collecting the speaker A1 (outputting the test audio at $X_1$) without blocked holes by the microphone B1 at $Y_1$ to $Y_5$ is: calibration energy data $ZB_{11}$, $ZB_{12}$, $ZB_{13}$, $ZB_{14}$ and $ZB_{15}$, respectively. Energy data obtained by collecting the speaker A1 (outputting the test audio at $X_1$) with hole blocking by the microphone B1 at $Y_1$ to $Y_5$ is: detected energy data $B_{11}$, $B_{12}$, $B_{13}$, $B_{14}$, and $B_{15}$, respectively. It can be learned, through comparison between two sets of data, that at different level gains, after holes of the speaker A1 are blocked, energy values weakened by hole blocking are not linear. For example, a difference between $B_{15}$ and $ZB_{15}$ (namely, an energy value weakened by hole blocking) is greater than a difference between $B_{11}$ and $ZB_{11}$. Therefore, in this embodiment, the first energy data is determined based on the plurality of pieces of first detection energy data, and the second energy data is determined based on the plurality of pieces of second detected energy data. This can more accurately represent a hole blocking status of the speaker A1 when compared with detected energy data at a single level gain, so as to avoid determining by using single pieces of detected energy data with relatively large deviations, and therefore avoid caused misdetermining.

It should be noted that, in Manner 2, a level gain of the microphone needs to be adjusted during a process of outputting the first audio by the speaker A1. Based on this, when the first audio output by the speaker A1 is audio during a call, in order to avoid affecting call quality of both parties of the call, the first energy data and the second energy data may be implemented in Manner 1. In this way, the electronic device 100 does not need to adjust a level gain of the microphone B1 and the microphone B2 for detection, so as to avoid a problem that volume during the call suddenly becomes small or large due to adjustment of the level gain. This helps ensure call quality.

It should be understood that the content above illustrates that both the first energy data and the second energy data are obtained in Manner 1 or Manner 2. It should be understood that, in other embodiments, a manner of obtaining the first energy data may be different from a manner of obtaining the second energy data. For example, the first energy data is obtained in Manner 1, and the second energy data is obtained in Manner 2, which is not specifically limited in this embodiment of this application.

It should be further noted that, regardless of Manner 1 or Manner 2, in a process of performing S601, the electronic device 100 does not need to adjust the volume level of the speaker A1 to a specific volume level, and also does not need to adjust the level gain of the microphone to specific level gain. S601 may be performed at any volume level and level gain. In this way, firstly, there is no need to adjust the volume level to a specific volume level, so as to avoid a problem that audio output by the speaker A1 suddenly becomes small or large due to adjustment of the volume level. This helps ensure auditory experience of a user. Especially in a case in which the first audio is audio output by the speaker A1 in the user's routine use of the speaker A1, this embodiment does not affect experience of the user's routine use of the speaker A1. Secondly, as shown in FIG. 8, at different level gains, volume of the detected audio module weakened by hole blocking is not constant. In this embodiment, detection is performed at any level gain, which can avoid misdetermining caused by data occasionally. Thirdly, a volume level and a level gain set by the user during routine use of the electronic device 100 are uncertain, and implementation of S601 at any volume level and any level gain is supported. Therefore, implementation of S601 at any moment of routine audio outputting by the speaker A1 can be supported in this embodiment.

After the first energy data and the second energy data are obtained, there is a need to determine, based on the first energy data and the second energy data, whether holes of the speaker A1 are blocked. The following describes in detail process of determining, based on the first energy data and the second energy data, whether holes of the speaker A1 are blocked.

S602. Determine whether a difference between first calibration data and the first energy data is greater than a first threshold.

If yes, S603 is performed. If no, it is determined that holes of the speaker A1 are not blocked, and in this case, S606 may be performed.

The first calibration data is volume collected by the microphone B1 without blocked holes when the speaker A1 outputs test audio without hole blocking. Because the first calibration data is collected when holes of the speaker A1 and the microphone B1 are not blocked, the first calibration data may indicate that holes of the speaker A1 and the microphone B1 are not blocked.

It should be noted that, due to different manners of obtaining the first energy data, the first calibration data from which the first energy data is subtracted also differs, which is specifically discussed below.

Example 1. If the first energy data is obtained in Manner 1 in S601, the first calibration data is volume collected by the microphone B1 at the first level gain when the speaker A1 outputs the test audio at the first volume level, that is, calibration energy data corresponding to the first volume level and the first level gain in Table 1 is obtained. In other words, the first energy data and the first calibration data have a same volume level and a same level gain.

To obtain the first calibration data in Example 1, the electronic device 100 may perform lookup and invoking on Table 1 based on the first volume level of the speaker A1 and the first level gain of the microphone B1 to obtain the first calibration data having the same volume level and the same level gain.

The foregoing example is still used. Refer to Table 1. If the first volume level is $X_1$ and the first level gain is $Y_2$, the first energy data is detected energy data $B_{12}$ and the first calibration data is calibration energy data $ZB_{12}$. For another example, if the first volume level is $X_3$ and the first level gain is $Y_4$, the first energy data is detected energy data $B_{34}$ and first calibration data is calibration energy data $ZB_{34}$.

Example 2: If the first energy data is obtained in Manner 2 in S601, the first calibration data is determined based on a plurality of pieces of first calibration energy data obtained by the microphone B1. The plurality of pieces of calibration energy data are volume that has values in one-to-one correspondence with all second level gains and that is obtained by the microphone B1 at the plurality of second level gains when the speaker A1 outputs the test audio at the first volume level, namely, calibration energy data corresponding to the first volume level and each second level gain in Table 1. It can be learned that the first energy data and the first calibration data are obtained at the same volume level and at the same plurality of level gains.

To obtain the first calibration data in Example 2, there is a need to first obtain the plurality of pieces of first calibration energy data. Specifically, the electronic device 100 may perform lookup and invoking on Table 1 based on the first volume level of the speaker A1 and the plurality of second level gains of the microphone B1 to obtain the plurality of pieces of first calibration energy data that are in one-to-one correspondence with the plurality of pieces of first detected energy data. After the plurality of pieces of first calibration energy data are obtained, the first energy data is determined based on the plurality of pieces of first calibration energy data. It should be understood that a manner in which the first calibration data is determined based on the plurality of pieces of first calibration energy data is the same as a manner in which the first energy data is determined based on the plurality of pieces of first detected energy data. Reference may be made thereto for implementation, and details are not described herein again.

The foregoing example is still used. Refer to Table 1. If the first volume level is $X_1$ and the second level gains are respectively $Y_1$, $Y_3$, and $Y_5$, the plurality of pieces of first detected energy data are respectively detected energy data $B_{11}$, $B_{13}$, and $B_{15}$ and the first energy data is determined based on the detected energy data $B_{11}$, $B_{13}$, and $B_{15}$; the plurality of pieces of first calibration energy data are respectively calibration energy data $ZB_{11}$, $ZB_{13}$, and $ZB_{15}$, and the first calibration data is determined based on the calibration energy data $ZB_{11}$, $ZB_{13}$, $ZB_{15}$.

To obtain the first threshold for determining whether holes of the speaker A1 are blocked, in this embodiment of this application, a set of hole blocking calibration energy data capable of indicating hole blocking of the speaker A1 may be obtained in advance. The following describes a process of obtaining the set of hole blocking calibration energy data.

For example, before delivery of the electronic device 100 (the electronic device 100 herein should be understood as another electronic device of a same model), impurities are applied to a position of the speaker A1 of the electronic device 100 to simulate a case in which holes of the speaker A1 are blocked. Then, hole blocking calibration energy data shown in Table 5 can be obtained by using a detection process the same as that for Table 1. Details are not described herein again.

TABLE 5

Detection status of hole blocking calibration energy data obtained through detection on the speaker A1 by using the microphone B1

| | Level gain | | | | |
|---|---|---|---|---|---|
| Volume level | $Y_1$ | $Y_2$ | $Y_3$ | $Y_4$ | $Y_5$ |
| $X_1$ | $A1B_{11}$ | $A1B_{12}$ | $A1B_{13}$ | $A1B_{14}$ | $A1B_{15}$ |
| $X_2$ | $A1B_{21}$ | $A1B_{22}$ | $A1B_{23}$ | $A1B_{24}$ | $A1B_{25}$ |
| $X_3$ | $A1B_{31}$ | $A1B_{32}$ | $A1B_{33}$ | $A1B_{34}$ | $A1B_{35}$ |
| $X_4$ | $A1B_{41}$ | $A1B_{42}$ | $A1B_{43}$ | $A1B_{44}$ | $A1B_{45}$ |
| $X_5$ | $A1B_{51}$ | $A1B_{52}$ | $A1B_{53}$ | $A1B_{54}$ | $A1B_{55}$ |

$A1B_{ij}$ represents volume collected by the microphone B1 without blocked holes at $Y_j$ when the speaker A1 with hole blocking outputs the test audio at $X_i$. Because the data in Table 5 is collected when holes of the speaker A1 are blocked, the hole blocking calibration energy data shown in Table 5 may indicate that holes of the speaker A1 are blocked.

The first threshold in S602 may be obtained based on a difference between the first calibration data and the first hole blocking calibration data minus an error margin reserved for a misdetermining factor (such as accuracy of the microphone B1, and a difference between two audio sources: the test audio and the first audio). For a specific manner of obtaining the first calibration data, refer to related content of S602. Details are not described herein again. The first hole blocking calibration data is used to indicate volume obtained by the microphone B1 without blocked holes by collecting the test audio output by the speaker A1 with hole blocking. Therefore, the first hole blocking calibration data may indicate that holes of the speaker A1 are blocked, and may be obtained based on Table 5. The first calibration data may indicate that holes of the speaker A1 are not blocked, and the first hole blocking calibration data may indicate that holes of the speaker A1 are blocked. Therefore, the difference between the two may indicate that a status of the difference between the first calibration data and the first energy data when holes of the speaker A1 are blocked.

It should be noted that, due to different manners of obtaining the first energy data and the first calibration data, the first hole blocking calibration data used for determining the first threshold also differs, which is specifically discussed in detail below.

In some embodiments of this application, if the first energy data in S601 is obtained in Manner 1, the first calibration data is the calibration energy data corresponding to the first volume level and the first level gain in Table 1, and the first hole blocking calibration data is the hole blocking calibration energy data corresponding to the first volume level and the first level gain in Table 5. The electronic device 100 may perform lookup and invoking on Table 1 and Table 5 based on the first volume level of the speaker A1 and the first level gain of the microphone B1 to respectively obtain the first calibration data and the first hole blocking calibration data. It can be learned that the first calibration data and the first hole blocking calibration energy data are obtained at the same volume level and level gain.

The foregoing example is still used. If the first energy data and the first calibration data are respectively detected energy data $B_{ij}$ and calibration energy data $ZB_{ij}$, the first threshold may be a difference between the calibration energy data $ZB_{ij}$ and the hole blocking calibration energy data $A1B_{ij}$ minus the error margin (for example, 2). For example, if the first energy data is detected energy data $B_{12}$ and the first calibration data is calibration energy data $ZB_{12}$, the first hole blocking calibration data is $A1B_{12}$ and the first threshold is $(ZB_{12}-A1B_{12})-2$. For another example, if the first energy data is detected energy data $B_{34}$ and the first calibration data is calibration energy data $ZB_{34}$, the first hole blocking calibration data is $A1B_{34}$ and the first threshold is $(ZB_{34}-A1B_{34})-2$.

In some other embodiments of this application, if the first energy data in S601 is obtained in Manner 2, the first calibration data is determined based on the first volume level in Table 1 and a plurality of pieces of first calibration energy data in one-to-one correspondence with a plurality of second level gains. The first hole blocking calibration data is determined based on a plurality of pieces of first hole blocking calibration energy data. The plurality of pieces of first hole blocking calibration energy data are volume that has values in one-to-one correspondence with all second level gains and that is obtained by the microphone B1 with blocked holes at the plurality of second level gains when the speaker A1 without blocked holes outputs the test audio at the first volume level. The electronic device 100 may perform lookup and invoking on Table 5 based on the first volume level of the speaker A1 and the plurality of second level gains of the microphone B1 to obtain the plurality of pieces of first hole blocking calibration energy data. It can be learned that the first calibration data and the first hole blocking calibration energy data are obtained at the same volume level and at the same plurality of level gains.

It should be understood that a manner in which the first hole blocking calibration data is determined based on the plurality of first hole blocking calibration energy data is the same as a manner in which the first calibration data is determined based on the plurality of pieces of first calibration energy data. For example, if the first calibration data is determined based on a weighted average of the plurality of pieces of first calibration energy data, the first hole blocking calibration data should also be determined based on a weighted average of the plurality of pieces of first hole blocking calibration energy data. For details, refer to specific implementation of the first calibration data. Details are not described herein again. It should be understood that, if the first energy data in S601 is obtained in Manner 1, the first threshold may also be determined based on this embodiment, which is not specifically limited in this application.

The foregoing example is still used. If the first energy data is determined based on detected energy data $B_{11}$, $B_{13}$, and $B_{15}$ and the first calibration data is determined based on calibration energy data $ZB_{11}$, $ZB_{13}$, and $ZB_{15}$ (for example, $ZB_1$), the foregoing plurality of pieces of first hole blocking calibration energy data are respectively the hole blocking calibration energy data $A1B_{11}$, $A1B_{13}$, and $A1B_{14}$. The first hole blocking calibration data is determined based on the hole blocking calibration energy data $A1B_{11}$, $A1B_{13}$, and $A1B_{14}$ (for example, $A1B_1$), and the first threshold is $(ZB_1-A1B_1)-2$.

It should be noted that, for the first threshold, reasons for subtracting the error margin from the difference between the first calibration data and the first hole blocking calibration data are as follows:

The first calibration data, the first energy data, and the first hole blocking calibration data are all negative values, and a larger absolute value indicates lower volume. Therefore, after holes of the speaker A1 are blocked, both the first energy data serving as the subtrahend in S602 and the first hole blocking calibration data serving as the subtrahend in the first threshold decrease. In this case, the first energy data and the first hole blocking calibration data is less than the first calibration data. Based on this, the difference between the first calibration data and the first energy data and the difference between the first calibration data and the first hole blocking calibration data increase, and both are positive values.

When holes of the speaker A1 are blocked, theoretically, if there is no error factor, the difference between the first calibration data and the first energy data is supposed to be greater than the difference between the first calibration data and the first hole blocking calibration data. However, existence of the error factor may reduce the difference between the first calibration data and the first energy data, which is accordingly less than the difference between the first calibration data and the first hole blocking calibration data. If the first threshold is set to the difference between the first calibration data and the first hole blocking calibration data, the difference between the first calibration data and the first energy data may still be less than the first threshold (the condition for hole blocking of the speaker A1 in S602 is not met) due to the existence of the error factor. Obviously, this is inconsistent with the fact that holes of the speaker A1 are blocked. Based on this, to prevent the error factor from interfering with determining of hole blocking of the speaker A1, the first threshold needs to be the error margin subtracted from the difference between the first calibration data and the first hole blocking calibration data, so as to adjust the first threshold to be lower. In this way, when holes of the speaker A1 are blocked, even if the error factor causes the difference between the first calibration data and the first energy data to decrease, because the first threshold also decreases, the difference between the first calibration data and the first energy data is greater than the first threshold (the condition for hole blocking of the speaker A1 in S602 is met), so that misdetermining can be avoided.

S603. Determine whether a difference between second calibration data and the second energy data is greater than a second threshold.

If yes, S604 is performed. If no, it is determined that holes of the speaker A1 are not blocked, and in this case, S606 may be performed.

The second calibration data is energy data collected by the microphone B1 without blocked holes when speaker A1 without blocked holes outputs the test audio, that is, the second calibration data is collected when holes of the speaker A1 are not blocked. Therefore, the second calibration data may indicate that holes of the speaker A1 are not blocked.

It should be noted that, due to different manners of obtaining the second energy data, the second calibration data from which the second energy data is subtracted and the second threshold in S603 also differ. A specific implementation is similar to that of the first calibration data and the first threshold. For details, refer to specific implementation of the first calibration data and the first threshold. Details are not described herein again. It should be understood that, different from the first calibration data, the second calibration data may be obtained by invoking the data in Table 2.

It should be understood that an execution order of the foregoing S602 and S603 may be reversed, which is not specifically limited in this embodiment of this application.

S604. Determine that holes of the speaker A1 are blocked.

During a specific implementation process, hole blocking of the speaker A1 may be determined by defining a variable and assigning a value to the variable. For example, a variable a is defined to determine a detection result of the speaker A1. When variable a=1, it is determined that holes of the speaker A1 are blocked; when the variable a=0, it is determined that holes of the speaker A1 are not blocked.

It should be understood that this S604 may also be absent, that is, after the condition in S603 is met, S604 is directly skipped, and S605 is performed.

To improve an audio effect of the speaker A1. after the foregoing S604 in FIG. 6 is performed, the audio module detection method shown in FIG. 6 may further include the following step.

S605. Output hole blocking prompt information used for indicating hole blocking of the speaker A1, and/or increase a volume level of the speaker A1.

The hole blocking prompt information may be in a form of text, voice, and/or the like.

Figure 9:
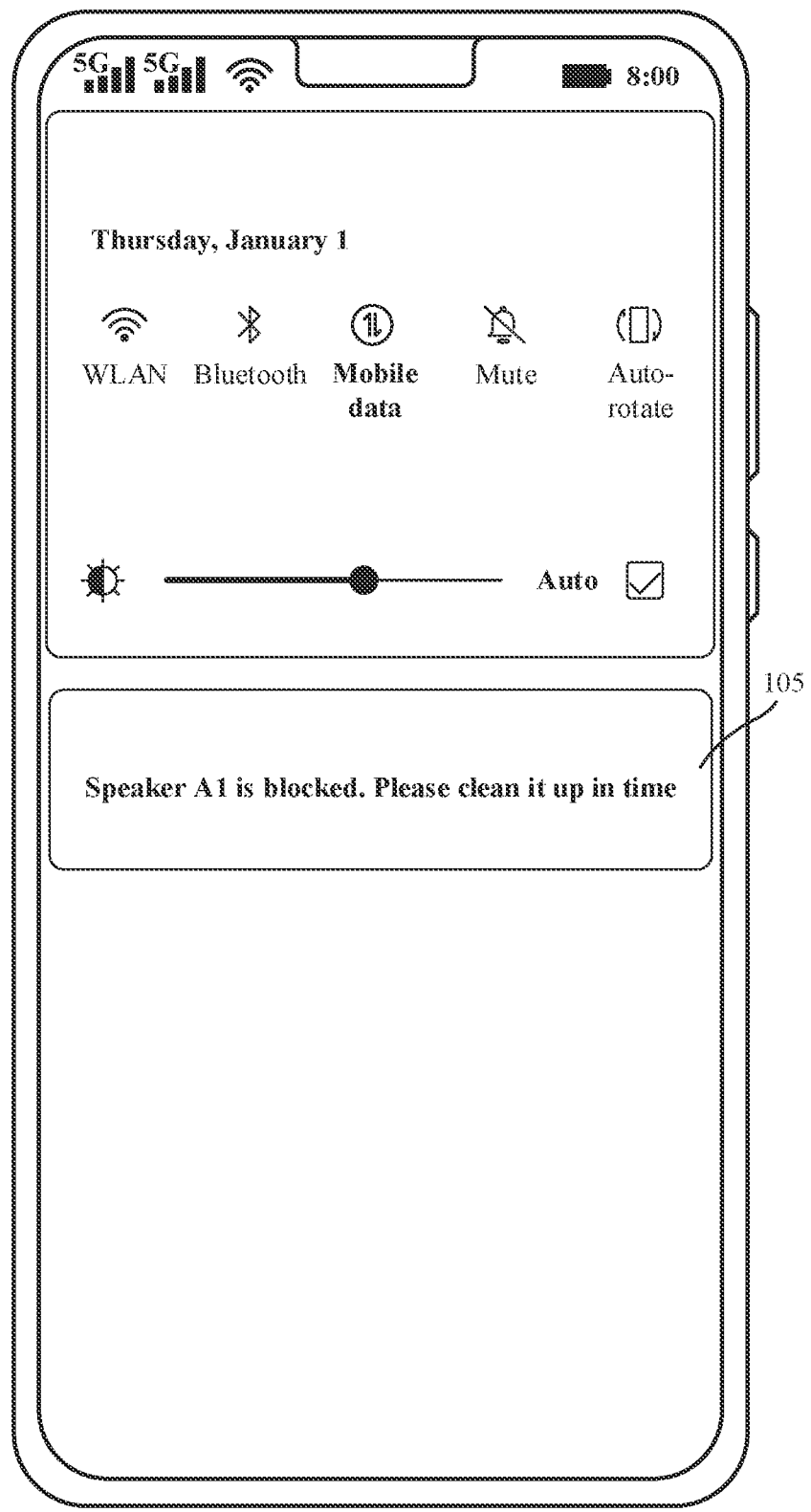
FIG. 9 is a schematic diagram of a notification bar interface of hole blocking information according to an embodiment of this application.

For example, in S605, as shown in FIG. 9, in response to the user's pull-down operation on the electronic device 100, the electronic device 100 displays a notification bar 105. The notification bar 105 may output words "Holes of the speaker A1 are blocked. Please clean it up in time" to remind the user to clean up the speaker A1 with hole blocking in time, so as to improve audio of the speaker A1.

For example, in S605, when it is determined that holes of the speaker A1 are blocked, the volume level of the speaker A1 may be further increased to compensate for a weakened energy value. For example, a volume level 1 of the speaker A1 to a volume level 2 to amplify volume of output audio.

It should be noted that, after the foregoing S605 in FIG. 6 is performed, the audio module detection method shown in FIG. 6 may further include the following step:

S606. Disable the audio hole blocking detection function of the electronic device 100.

Through this step, the audio hole blocking detection function of the electronic device 100 can be disabled immediately after a hole blocking status of the speaker A1 is determined, to prevent the audio hole blocking detection function of the electronic device 100 from being enabled for a long time and from being frequently triggered to perform the detection process shown in FIG. 6. Certainly, in other embodiments, the foregoing audio module detection method may alternatively not include S606, which is not specifically limited in this embodiment of this application.

In the solution shown in FIG. 6, when holes of the speaker A1 are blocked, an energy value of the first audio output by the speaker A1 is weakened, so that both the first energy data collected by the microphone B1 and the second energy data collected by the microphone B2 greatly decrease. Both the difference between the first calibration data and the first energy data and the difference between the second calibration data and the second energy data increase. Whether holes of the speaker A1 are blocked can be determined by determining whether the difference between the first calibration data and the first energy data is greater than the first threshold capable of indicating hole blocking of the speaker A1 (a first condition) and whether the difference between the second calibration data and the second energy data is greater than the second threshold capable of indicating hole blocking of the speaker A1 (a second condition).

It should be noted that, in the solution shown FIG. 6, using energy data collected by two microphones to determine a hole blocking status of the speaker A1 can reduce a misdetermining rate, and reasons are as follows:

When holes of the speaker A1 are not blocked but holes of the microphone B1 or the microphone B2 are blocked, a microphone with hole blocking also weakens the energy value of the first audio, causing the first energy data to greatly decrease, and meeting the first condition. A case similar to hole blocking of the speaker A1 appears. In this case, if the hole blocking status of the speaker A1 is determined based on energy data collected by a single microphone, when the first condition is met, it is determined that holes of the speaker A1 are blocked. Obviously, this is inconsistent with the fact that holes of the microphone B1 are blocked and holes of the speaker A1 are not blocked, thereby causing misdetermining. In addition, because a probability of hole blocking of a single microphone is relatively high, a probability that energy data collected by the microphone meets a hole blocking condition is relatively high, thereby resulting in a relatively high probability of misdetermining.

In order to determine an audio module with blocked holes, in the solution shown in FIG. 6, the microphone B2 is further introduced to collect the first audio output by the speaker A1. When the audio module with blocked holes is the microphone B1, the second energy data collected by the microphone B2 is not affected. Therefore, the difference between the second calibration data and the second energy data is not increased and is unlikely to be greater than the second threshold. The second condition for hole blocking of the speaker A1 is not met, and therefore misdetermining of hole blocking of the speaker A1 is avoided. In other words, unless holes of the speaker A1 are blocked, it is difficult for both the first condition and the second condition to be met.

In addition, in the solution shown in FIG. 6, hole blocking of both the microphone B1 and the microphone B2 also causes the first energy data and the second energy data to greatly decrease, and therefore it is possible that both the first condition and the second condition are met. However, in a solution of using a single microphone for detection, because a probability of hole blocking of both the microphone B1 and the microphone B2 is relatively low, there is a relatively low possibility that both the first condition and the second condition are met because holes of both the microphone B1 and the microphone B2 are blocked. Therefore, compared with the solution of using a single microphone for detection, this embodiment helps reduce a misdetermining rate.

In order to reduce a high misdetermining rate caused by occasionality of a single detection result, in some embodiments of this application, a single detection process of the audio module detection method shown in FIG. 6 may be cyclically performed, to perform detection on the hole blocking status of the speaker A1 for a plurality of times, and determine, based on a plurality of detection results, whether holes of the speaker A1 are blocked.

Figure 10:
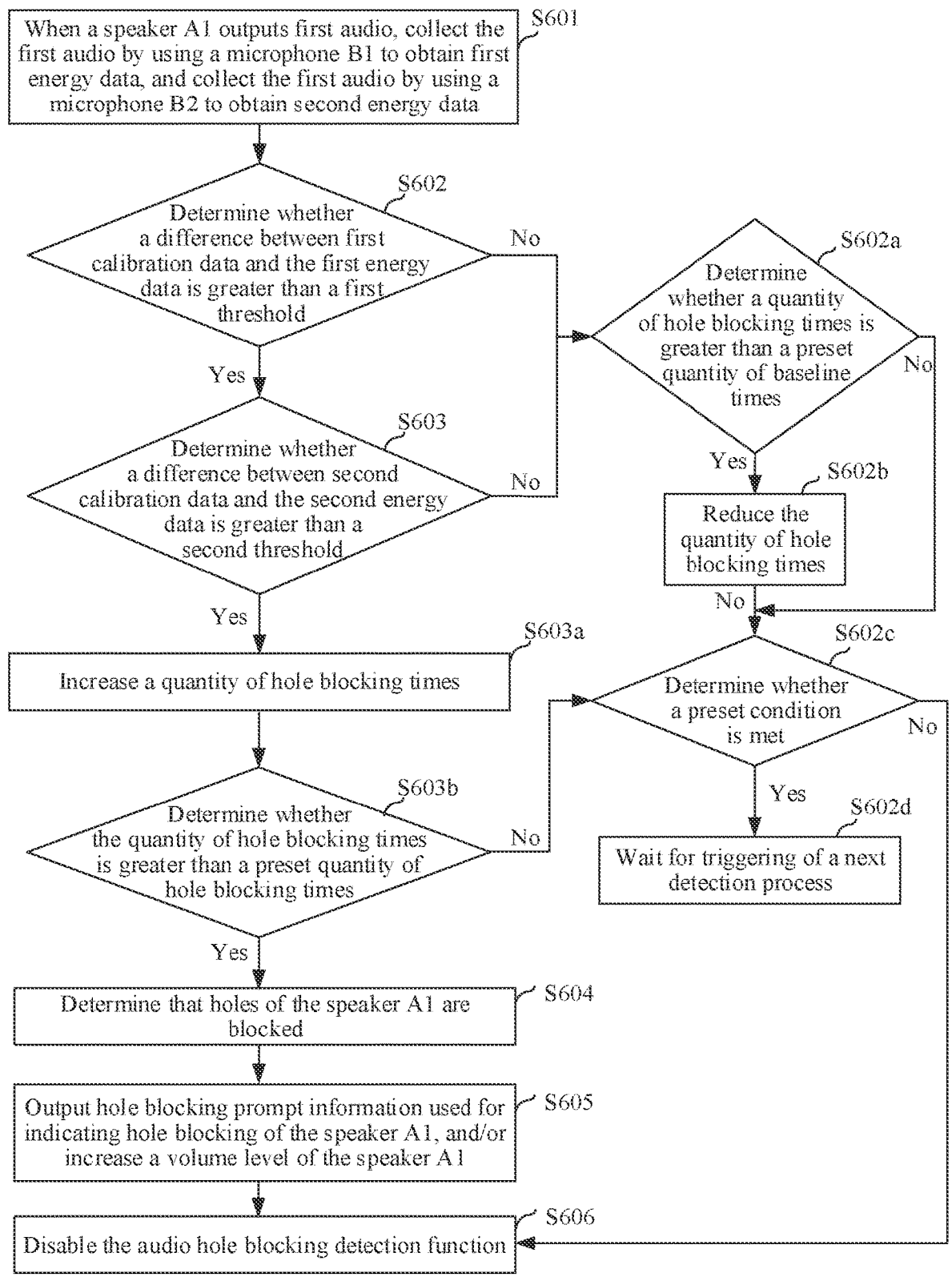
FIG. 10 is a schematic flowchart of another audio module detection method according to an embodiment of this application.

For example, as shown in FIG. 10, different from the audio module detection method shown in FIG. 6, if the difference between second calibration data and the second energy data is greater than the second threshold in S603, it indicates that hole blocking of the speaker A1 is determined only in a current detection process. In this case, in order to reduce a rate of misdetermining hole blocking of the speaker A1 due to a single detection result, it is not directly determined that holes of the speaker A1 are blocked, but instead, the following S603a and S603b are performed to implement detection for a plurality of times.

S603a. Increase a quantity of hole blocking times.

The quantity of hole blocking times is used to record a total quantity of times that hole blocking of the speaker A1 is determined during a multi-detection process. The quantity of hole blocking times may be a variable defined in the electronic device 100. When the electronic device 100 is triggered to enable the audio hole blocking detection function, the variable is assigned with an initial value (for example, 0), and increases when hole blocking of the speaker A1 is determined in a single detection process.

S603b. Determine whether the quantity of hole blocking times is greater than a preset quantity of hole blocking times.

The preset quantity of hole blocking times may be set to any value greater than the initial value of the quantity of hole blocking times as required. For example, if the initial value assigned to the quantity of hole blocking times is 0, the preset quantity of hole blocking times may be 50, 60, 80, or the like.

If yes, S604 is performed.

In this embodiment, a condition is added for determining hole blocking of the speaker A1 only when the quantity of hole blocking times is greater than the preset quantity of hole blocking times. In this way, in the solution shown in FIG. 10, energy data of the first audio at different moments can be collected to perform determining for a plurality of times. This can reduce a misdetermining rate of hole blocking when compared with collection of energy data only at one moment in FIG. 6.

Further, there is a possibility of misdetermining when the hole blocking status of the speaker A1 is determined based on a single detection result. In order to prevent accumulation of single detection results for a long time from causing the quantity of hole blocking times to exceed the preset quantity of hole blocking times, leading to misdetermining, as shown in FIG. 10, different from the audio module detection method shown in FIG. 6, the following S602a is performed if a determining result is no in S602 and S603.

S602a. Determine whether the quantity of hole blocking times is greater than a preset quantity of baseline times.

If yes, S602b is performed. The preset quantity of baseline times is an initial value (for example, 0) assigned when the electronic device 100 is triggered to enable the audio hole blocking detection function, and may be set as required.

S602b. Reduce the quantity of hole blocking times.

For a definition of the quantity of hole blocking times, refer to the description of S603a. Details are not described herein again. The quantity of hole blocking times is reduced when it is determined that holes are not blocked during a single detection process.

In this embodiment, when the difference between the first calibration data and the first energy data is greater than the first threshold or the difference between the second calibration data and the second energy data is greater than the second threshold, it indicates that a current detection result is that holes are not blocked. In this case, in a previous detection process, the quantity of hole blocking times (the part exceeding a preset quantity of baseline times) accumulated because a determining result is hole blocking may be misdetermined. Therefore, when a current detection result is different from a previous test result, the quantity of accumulated hole blocking times is reduced to offset a quantity of previously accumulated hole blocking times. This can prevent the quantity of hole blocking times from exceeding the preset quantity of hole blocking times caused by an excessive misdetermining quantity of single detection, and therefore prevent final misdetermining.

In order to reduce power consumption of the electronic device 100, in some embodiments of this application, different from the audio module detection method shown in FIG. 6, as shown in FIG. 10, S602c may be further performed after S602b, S603b, or S603a is performed.

S602c. Determine whether a preset condition is met.

The preset condition in S602c include one or more of the following:

Whether a function trigger time is greater than a preset time. The function triggering time means a time from a moment at which the electronic device 100 is triggered to enable the audio hole blocking detection function to a moment when the electronic device 100 performs S602b. The preset time may be set, for example, to 5 days or 15 days, as required. It should be noted that, if the audio hole blocking detection function is triggered based on Application scenario (2), the preset time herein is not greater than the preset period in Application scenario (2).

Whether a quantity of detection times is greater than a preset quantity of detection times. Performing the audio module detection method shown in FIG. 10 by the electronic device 100 is considered as a single detection process. The quantity of detection times means a quantity of accumulated times the electronic device 100 performs the single detection process after the electronic device 100 is triggered to enable the audio hole blocking detection function. It should be understood that, in order to obtain the quantity of detection times of the electronic device 100, in the method shown in FIG. 10, the quantity of detection times may be increased after S604 or S602a is performed. The preset quantity of detection times may be set, for example, to 60 times or 70 times, as required.

If yes, S606 is performed. If no, S602d is performed.

S602d. Wait for triggering of a next detection process.

It should be understood that the next detection process refers to execution of the foregoing single detection process the next time. Condition for triggering the next detection process may be as follows:

Case 1: The electronic device 100 may trigger the next detection process when it is triggered to output another first audio.

For example, it is assumed that the first audio output by the speaker A1 is audio A during a detection process currently performed by the electronic device 100. In this case, when the first audio output by the speaker A1 is audio B, the next detection process is triggered.

Case 2: During a process of outputting the first audio, the electronic device 100 may trigger the next detection process based on a preset detection period.

It should be understood that the preset detection period herein is different from the preset period in Application scenario (2). The preset period in Application scenario (2) is a time interval at which the audio hole blocking detection function is enabled every time, and is a period for the audio hole blocking detection function. The preset detection period herein is a time interval at which the detection process is triggered every time, and is a period for the detection process. After the electronic device 100 is triggered to enable the audio hole blocking detection function, the detection process may be performed for a plurality of times based on the preset detection period until the audio hole blocking detection function is disabled, and then, the audio hole blocking detection function may be enabled again based on the preset period. Based on this, the preset detection period should be less than the preset period.

For example, the preset detection period may be 2 minutes, 5 minutes, or the like. A preset detection period of 5 minutes is used as an example. It is assumed that a current time is $T_1$ at which the electronic device 100 performs a current detection process. In this case, a next detection process is triggered at $T_2$ after 5 minutes.

In this embodiment, when a determining condition for the preset condition is met, the audio hole blocking detection function of the electronic device 100 is disabled, to disable the audio hole blocking detection function of the electronic device 100 when holes of the speaker A1 are not blocked, so as to avoid power consumption caused by cyclically performing the audio module detection method shown in FIG. 10 by the electronic device 100. This has an effect of reducing power consumption. Certainly, in other embodiments, S602c and S602d may not be provided, which is not specifically limited in this embodiment of this application.

Embodiment 2: The Detected Audio Module is the Earpiece A2 in FIG. 1

Figure 11:
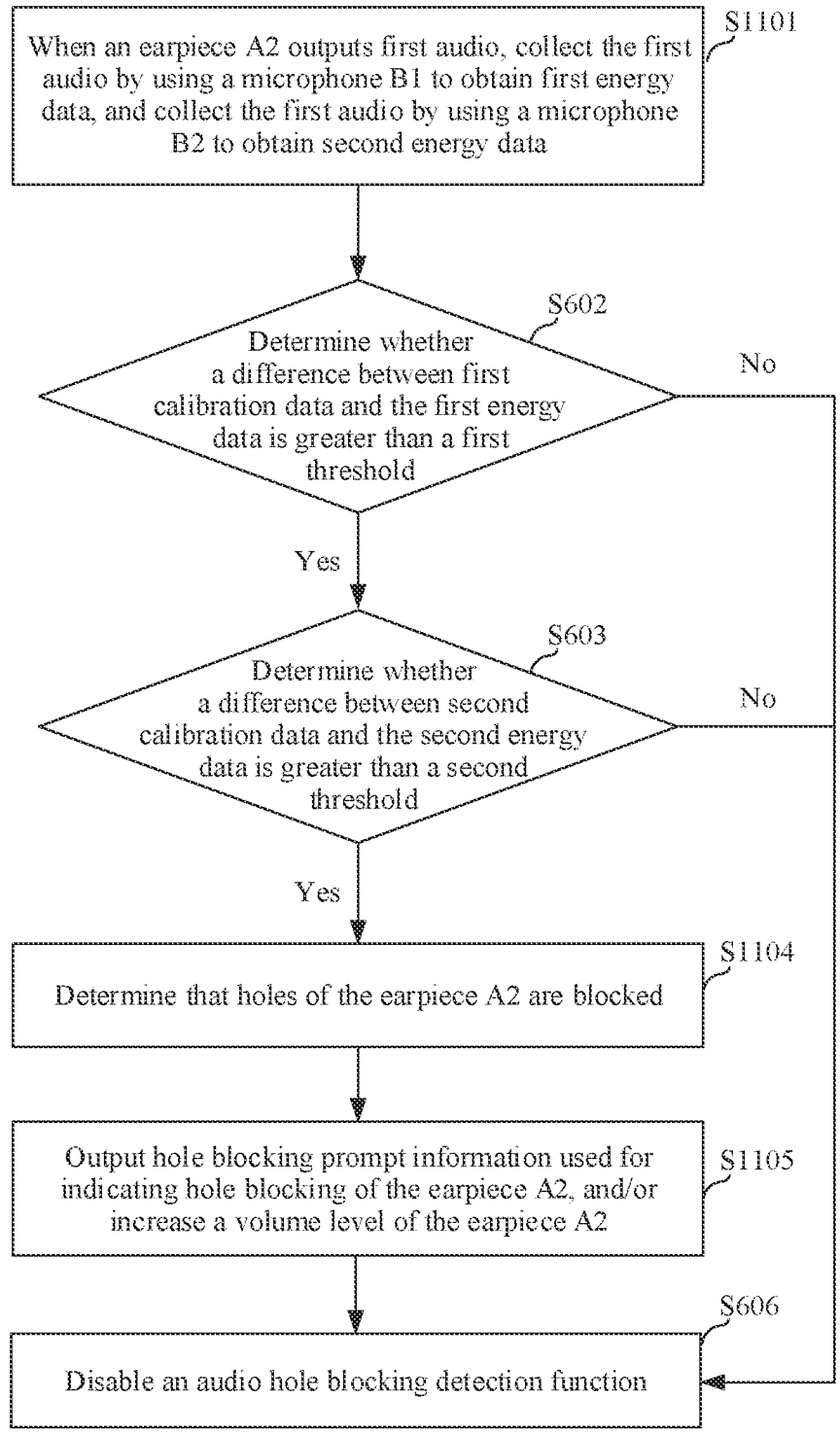
FIG. 11 is a schematic flowchart of another audio module detection method according to an embodiment of this application.
Figure 12:
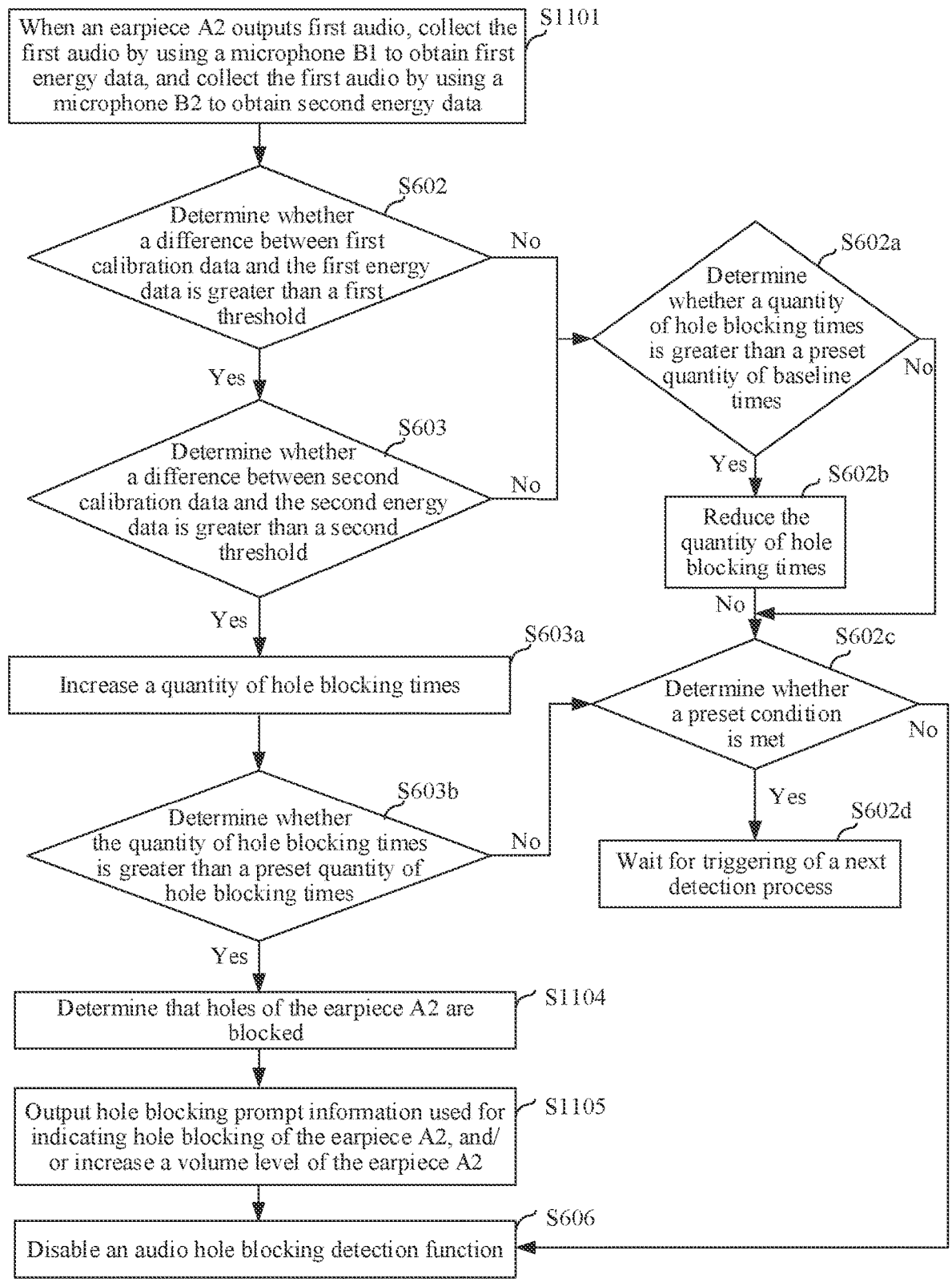
FIG. 12 is a schematic flowchart of another audio module detection method according to an embodiment of this application.

When the detected audio module is earpiece A2 in FIG. 1, the foregoing audio module detection method may be implemented by using the audio module detection method shown in FIG. 11 and FIG. 12. For example, refer to FIG. 11 and FIG. 12. When the detected audio module is the earpiece A2 in Embodiment 2 instead of the speaker A1 in Embodiment 1, different from the audio module detection method shown in FIG. 6 and FIG. 10, the audio module detection method shown in FIG. 12 is implemented by respectively replacing S601, S604, and S605 with S1101, S1104, and S1105. Details are as follows:

S1101. When the earpiece A2 outputs first audio, collect the first audio by using a microphone B1 to obtain first energy data, and collect the first audio by using a microphone B2 to obtain second energy data.

S1104. Determine that holes of the earpiece A2 are blocked.

S1105. Output hole blocking prompt information used for indicating hole blocking of the earpiece A2, and/or increase a volume level of the earpiece A2.

It should be noted that specific implementation of S1101, S1104, and S1105 is respectively similar to specific implementation of S601, S604, and S605. Reference may be made thereto for implementation, and details are not described herein again. It should be understood that, different from Embodiment 1, in this embodiment, the first volume level and the second volume level each are any one of M volume levels. The first calibration data may be obtained by invoking the data in Table 3, and the second calibration data may be obtained by invoking the data in Table 4.

It can be learned that when the detected audio module is the earpiece A2 in FIG. 1, a difference of Embodiment 2 from Embodiment 1 lies in that the detected object changes from the speaker A1 to the earpiece A2, and there is no other substantial differences. Therefore, for an implementation effect of the audio module detection method shown in FIG. 11 and FIG. 12, refer to the effect of the audio module detection method shown in FIG. 6 and FIG. 10. Details are not described herein again.

Embodiment 3: The Detected Audio Module is the Microphone B1 in FIG. 1

Figure 13:
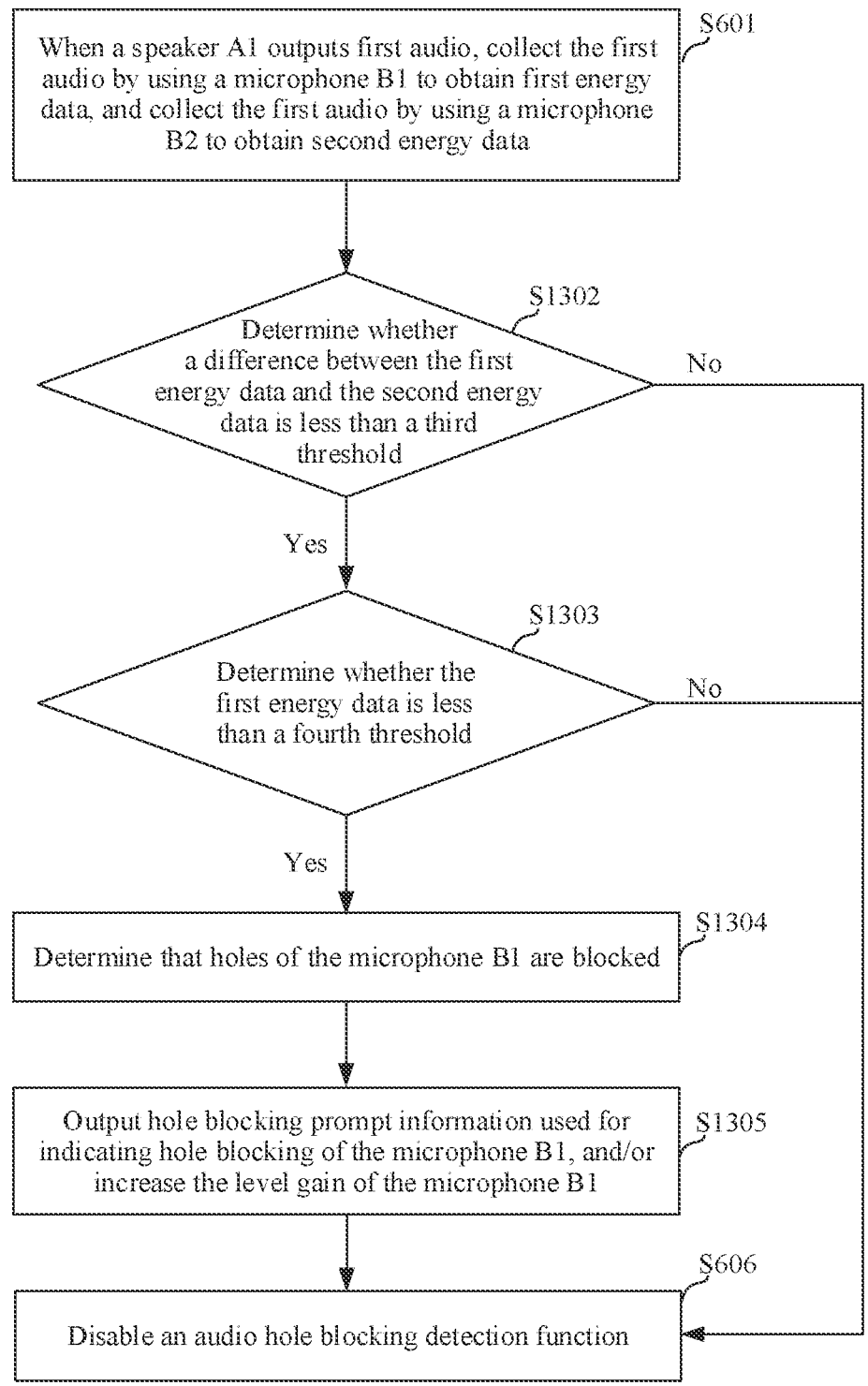
FIG. 13 is a schematic flowchart of another audio module detection method according to an embodiment of this application.
Figure 14:
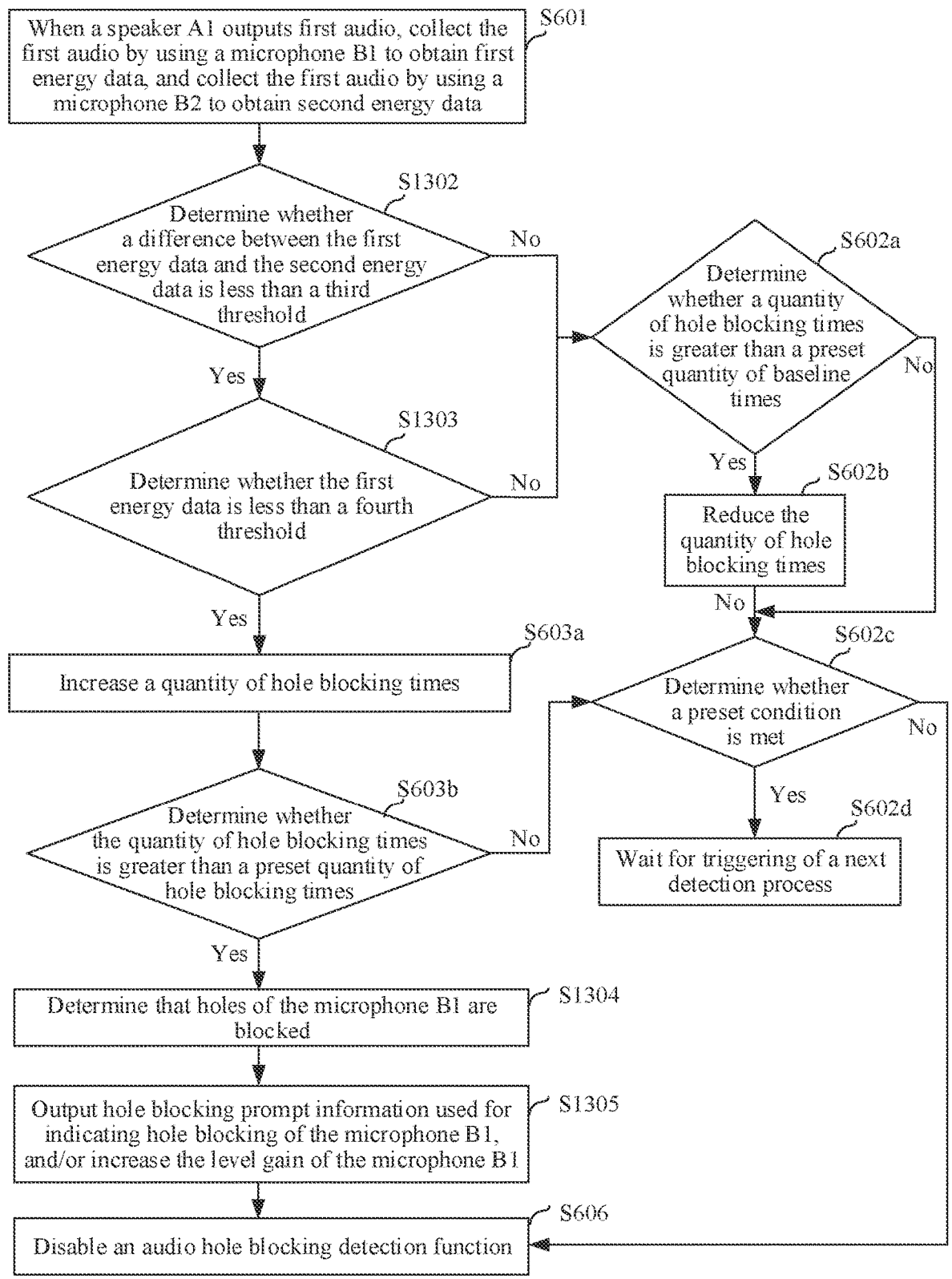
FIG. 14 is a schematic flowchart of another audio module detection method according to an embodiment of this application.

When the detected audio module is the microphone B1 in FIG. 1, the foregoing audio module detection method may be implemented by using the audio module detection method shown in FIG. 13 and FIG. 14. For example, as shown in FIG. 13 and FIG. 14, when the detected audio module is the microphone B1 in Embodiment 3 instead of the speaker A1 in Embodiment 1, different from the audio module detection method shown in FIG. 6 and FIG. 10, the audio module detection method shown in FIG. 13 and FIG. 14 is implemented by respectively replacing S602, S603, S604, and S605 with S1302, S1303, S1304, and S1305. Details are as follows:

S1302. Determine whether a difference between the first energy data and the second energy data is less than a third threshold.

If yes, S1303 is performed. Optionally, if no, it is determined that holes of the microphone B1 are not blocked.

It should be noted that there are also two manners of obtaining the first energy data and the second energy data. For specific implementation, refer to related content of S601 in Embodiment 1. Details are not described herein again. Different from Embodiment 1, comparison objects in Embodiment 3 are the first energy data and the second energy data. For comparability, preferably, the first energy data and the second energy data are obtained in a same manner. For example, both the first energy data and the second energy data may be obtained in Manner 1 or Manner 2: In this way, the first energy data and the second energy data are compared in a same dimension, and have comparability. A comparison result is also useful for determining whether holes of the microphone B1 are blocked.

To obtain the third threshold for determining whether holes of the microphone B1 are blocked, in this embodiment of this application, a set of hole blocking calibration energy data capable of indicating hole blocking of the microphone B1 may be obtained in advance. The following describes a process of obtaining the set of hole blocking calibration energy data.

For example, before delivery of the electronic device 100 (the electronic device 100 herein should be understood as another electronic device of a same model), impurities are applied to a position of the microphone B1 of the electronic device 100 to simulate a case in which holes of the microphone B1 are blocked. Then, hole blocking calibration energy data shown in Table 6 can be obtained by using a detection process the same as that for Table 1. Details are not described herein again.

TABLE 6

Detection status of hole blocking calibration energy data obtained through detection on the speaker A1 by using the microphone B1

| Volume level | Level gain | | | | |
|---|---|---|---|---|---|
| | $Y_1$ | $Y_2$ | $Y_3$ | $Y_4$ | $Y_5$ |
| $X_1$ | $B1B_{11}$ | $B1B_{12}$ | $B1B_{13}$ | $B1B_{14}$ | $B1B_{15}$ |
| $X_2$ | $B1B_{21}$ | $B1B_{22}$ | $B1B_{23}$ | $B1B_{24}$ | $B1B_{25}$ |
| $X_3$ | $B1B_{31}$ | $B1B_{32}$ | $B1B_{33}$ | $B1B_{34}$ | $B1B_{35}$ |
| $X_4$ | $B1B_{41}$ | $B1B_{42}$ | $B1B_{43}$ | $B1B_{44}$ | $B1B_{45}$ |
| $X_5$ | $B1B_{51}$ | $B1B_{52}$ | $B1B_{53}$ | $B1B_{54}$ | $B1B_{55}$ |

$B1B_{ij}$ represents volume collected by the microphone B1 with blocked holes at $Y_j$ when the speaker A1 without blocked holes outputs the test audio at $X_i$. Because the data in Table 6 is collected when holes of the microphone B1 are blocked, the hole blocking calibration energy data shown in Table 6 may indicate that holes of the microphone B1 are blocked.

The third threshold may be obtained based on a difference between the second hole blocking calibration data and the second calibration data superposed with an error margin. The error margin is reserved for some misdetermining factors (such as accuracy of the microphone B1, and a difference between two audio sources: the test audio and the first audio).

The second calibration data may be obtained based on Table 2. For a definition and specific implementation of the second calibration data, refer to S603. Details are not described herein again. The second hole blocking calibration data is used to indicate volume obtained by collecting the test audio by the microphone B1 with blocked holes. Therefore, the second hole blocking calibration data may indicate that holes of the microphone B1 are blocked, and may be obtained based on Table 6. The second calibration data may indicate that holes of neither of the speaker A1 and the microphone B2 are blocked, and the second hole blocking calibration data may indicate that holes of the microphone B1 are blocked. Therefore, the difference between the two may indicate that a status of the difference between the first energy data and the second energy data when holes of the microphone B1 are blocked.

It should be noted that, due to different manners of obtaining the first energy data and the second energy data, manners of obtaining the second hole blocking calibration data and the second calibration data also differ, which is specifically discussed in detail below.

In some embodiments of this application, if the first energy data and the second energy data in S1302 are obtained in Manner 1, the second calibration data is the calibration energy data corresponding to the second volume level and the third level gain in Table 2, and the second hole blocking calibration data is the hole blocking calibration energy data corresponding to the first volume level and the first level gain in Table 6. The electronic device 100 may perform lookup and invoking on Table 2 and Table 6 based on the first volume level of the speaker A1 and the first level gain of the microphone B1 to respectively obtain the second calibration data and the second hole blocking calibration data. It can be learned that the second hole blocking calibration energy data and the first energy data are obtained at the same volume level and level gain.

The foregoing example is still used. If the first energy data is detected energy data $B_{ij}$ and the second energy data is detected energy data $F_{ij}$, the second calibration data is calibration energy data $ZF_{ij}$ and the second hole blocking calibration data is hole blocking calibration energy data $B1B_{ij}$. The third threshold may be a difference between the hole blocking calibration energy data $B1B_{ij}$ and the calibration energy data $ZF_{ij}$ superimposed with an error margin (for example, 2). For example, if the first energy data is detected energy data $B_{12}$ and the second energy data is detected energy data $F_{34}$, the third threshold is $(B1B_{12}-ZF_{34})+2$.

In some other embodiments of this application, if the first energy data and the second energy data in S1302 are obtained in Manner 2, the second calibration data is determined based on the second volume level in Table 2 and a plurality of pieces of calibration energy data in one-to-one correspondence with a plurality of fourth level gains, and the second hole blocking calibration data is determined based on a plurality of pieces of second hole blocking calibration energy data. The plurality of pieces of second hole blocking calibration energy data are volume that has values in one-to-one correspondence with all third level gains and that is obtained by the microphone B1 with blocked holes at the plurality of third level gains when the speaker A1 without blocked holes outputs the test audio at the first volume level. It can be learned that the second hole blocking calibration energy data and the first energy data are obtained at the same volume level and at the same plurality of level gains.

It should be understood that a manner in which the second hole blocking calibration data is determined based on the plurality of second hole blocking calibration energy data is the same as a manner in which the first energy data is determined based on the plurality of pieces of first detected energy data. Reference may be made thereto for implementation, and details are not described herein again. It should be noted that, if the first energy data and the second energy data in S701 are obtained in Manner 1, the third threshold may also be determined based on this embodiment, which is not specifically limited in this application.

For example, if the first energy data is determined based on detected energy data $B_{11}$, $B_{13}$, and $B_{15}$ and the second energy data is determined based on detected energy data $F_{12}$, $F_{14}$, and $F_{15}$, the second calibration data is determined based on the calibration energy data $ZF_{12}$, $ZF_{14}$, and $ZF_{15}$ in Table 2 (for example, $ZF_1$). The foregoing plurality of pieces of second hole blocking calibration energy data are respectively the hole blocking calibration energy data $B1B_{11}$, $B1B_{13}$, $B1B_{15}$ in Table 7. The second hole blocking calibration data is determined based on the hole blocking calibration energy data $B1B_{11}$, $B1B_{13}$, and $B1B_{15}$ (for example, $B1B_1$), and the third threshold is $(B1B_1-ZF_1)+2$.

It should be noted that, for the third threshold, reasons for superimposing the difference between the second hole blocking calibration data and the second calibration data with the error margin are as follows:

The first energy data, the second energy data, the second hole blocking calibration data, and the second calibration data are all negative values, and a larger absolute value indicates lower volume. Therefore, after holes of the microphone B1 are blocked, the first energy data and the second blocking calibration data serving as minuends are greatly reduced, a difference between the first energy data and the second energy data and a difference between the second hole blocking calibration data and the second calibration data are greatly reduced.

When holes of the microphone B1 are blocked, theoretically, if there is no error factor, the difference between the first energy data and the second energy data is supposed to be less than the difference between the second hole blocking calibration data and the second calibration data. However, existence of the error factor may increase the difference between the second hole blocking calibration data and the second calibration data, which is accordingly greater than the difference between the second hole blocking calibration data and the second calibration data. If the second threshold is set to the difference between the second hole blocking calibration data and the second calibration data, the difference between the first energy data and the second energy data may still be greater than the second threshold (the condition for hole blocking of the microphone B1 in S1302 is not met) due to the existence of the error factor. Obviously, this is inconsistent with the fact that holes of the microphone B1 are blocked. Based on this, to prevent the error factor from interfering with determining of hole blocking of the microphone B1, the second threshold needs to be the error margin superimposed on the difference between the second hole blocking calibration data and the second calibration data, so as to adjust the second threshold to be higher. In this way, when holes of the microphone B1 are blocked, even if the error factor causes the difference between the first energy data and the second energy data to increase, because the second threshold also increases, the difference between the first energy data and the second energy data is less than the first threshold (the condition for hole blocking of the microphone B1 in S1302 is met), so that misdetermining can be avoided.

S1303. Determine whether the first energy data is less than a fourth threshold.

If yes, S1304 is performed. If no, it is determined that holes of the microphone B1 are not blocked, and in this case, S606 may be performed.

The fourth threshold used for determining whether holes of the microphone B1 are blocked may be obtained based on the second blocking calibration data superimposed with an error margin. The error margin is reserved for some misdetermining factors (such as accuracy of the microphone B1, and a difference between two audio sources: the test audio and the first audio source). It should be noted that, for specific implementation of the second hole blocking calibration data, reference may be made to related description of S1402. Details are not described herein again.

The foregoing example is still used. If the first energy data is detected energy data $B_{ij}$, the second hole blocking calibration data is hole blocking calibration energy data $B1B_{ij}$. In this case, the fourth threshold may be a sum of the hole blocking calibration energy data $B1B_{ij}$ and the error margin (for example, 2). For example, if the first energy data is detected energy data $B_{12}$, the fourth threshold is $B1B_{12}+2$.

If the first energy data is determined based on detected energy data $B_{11}$, detected energy data $B_{13}$, and detected energy data Bis, the second hole blocking calibration data is determined based on hole blocking calibration energy data $B1B_{11}$, $B1B_{13}$, and $B1B_{15}$ in Table 6 (for example, $B1B_1$). In this case, the fourth threshold is $B1B_1+2$.

It should be understood that an execution order of the foregoing S1302 and S1303 may be reversed, which is not specifically limited in this embodiment of this application.

S1304. Determine that holes of the microphone B1 are blocked.

For specific implementation of this step, refer to S604. Details are not described herein again.

To improve an audio effect of the microphone B1, S1305 may be further performed after S1304.

S1305. Output hole blocking prompt information used for indicating hole blocking of the microphone B1, and/or increase the level gain of the microphone B1.

When it is determined that holes of the microphone B1 are blocked, the level gain of the microphone B1 may be further increased to compensate for a weakened energy value. For example, a level gain 1 of the microphone B1 is increased to a level gain 2, to amplify volume of the collected audio. In addition, for specific implementation of the hole blocking prompt information, refer to step S605. Details are not described herein again.

In the audio module detection method shown in FIG. 13 and FIG. 14, when holes of the microphone B1 are blocked, and when the microphone B1 collects the first audio output by the speaker A1, the volume of the first audio is weakened, and consequently the collected first energy data is greatly reduced. However, the microphone B2 is not affected, and the second energy data collected by the microphone B2 is not be affected. Therefore, the difference between the first energy data and the second energy data is also reduced. Whether holes of the microphone B1 are blocked can be determined by determining whether the first energy data is less than the fourth threshold capable of indicating hole blocking of the microphone B1 (the first condition) and whether the difference between the first energy data and the second energy data is less than the third threshold capable of indicating that hole blocking of the microphone B1 (the second condition).

It should be noted that, in the solution shown in FIG. 13 and FIG. 14, using energy data collected by two microphones to determine a hole blocking status of the microphone B1 can reduce a misdetermining rate, and reasons are as follows:

When holes of the speaker A1 are blocked but holes of the microphone B1 are not blocked, the first energy data is also greatly reduced, and the first condition is met. A case similar to hole blocking of the microphone B1 appears. In this case, if the hole blocking status of the microphone B1 is determined based on energy data collected by a single microphone, when the first condition is met, it is determined that holes of the microphone B1 are blocked. Obviously, this is inconsistent with the fact that holes of the speaker A1 are blocked and holes of the microphone B1 are not blocked, thereby causing misdetermining. In addition, because a probability of hole blocking of a single microphone is relatively high, a probability that energy data collected by the microphone meets a hole blocking condition is relatively high, thereby resulting in a relatively high probability of misdetermining.

In order to determine an audio module with blocked holes, in the solution shown in FIG. 13 and FIG. 14, the microphone B2 is further introduced to collect the first audio output by the speaker A1. When the audio module with blocked holes is the speaker A1, impact on both the first energy data and the second energy data is greatly reduced, so that the difference between the first energy data and the second energy data does not change too much, and is unlikely to be less than the third threshold. The second condition for hole blocking of the microphone B1 is not met, and therefore misdetermining of hole blocking of the microphone B1 is avoided. In other words, unless holes of the microphone B1 are blocked, it is difficult for both the first condition and the second condition to be met.

Embodiment 4: The Detected Audio Module is the Microphone B2 in FIG. 1

Figure 15:
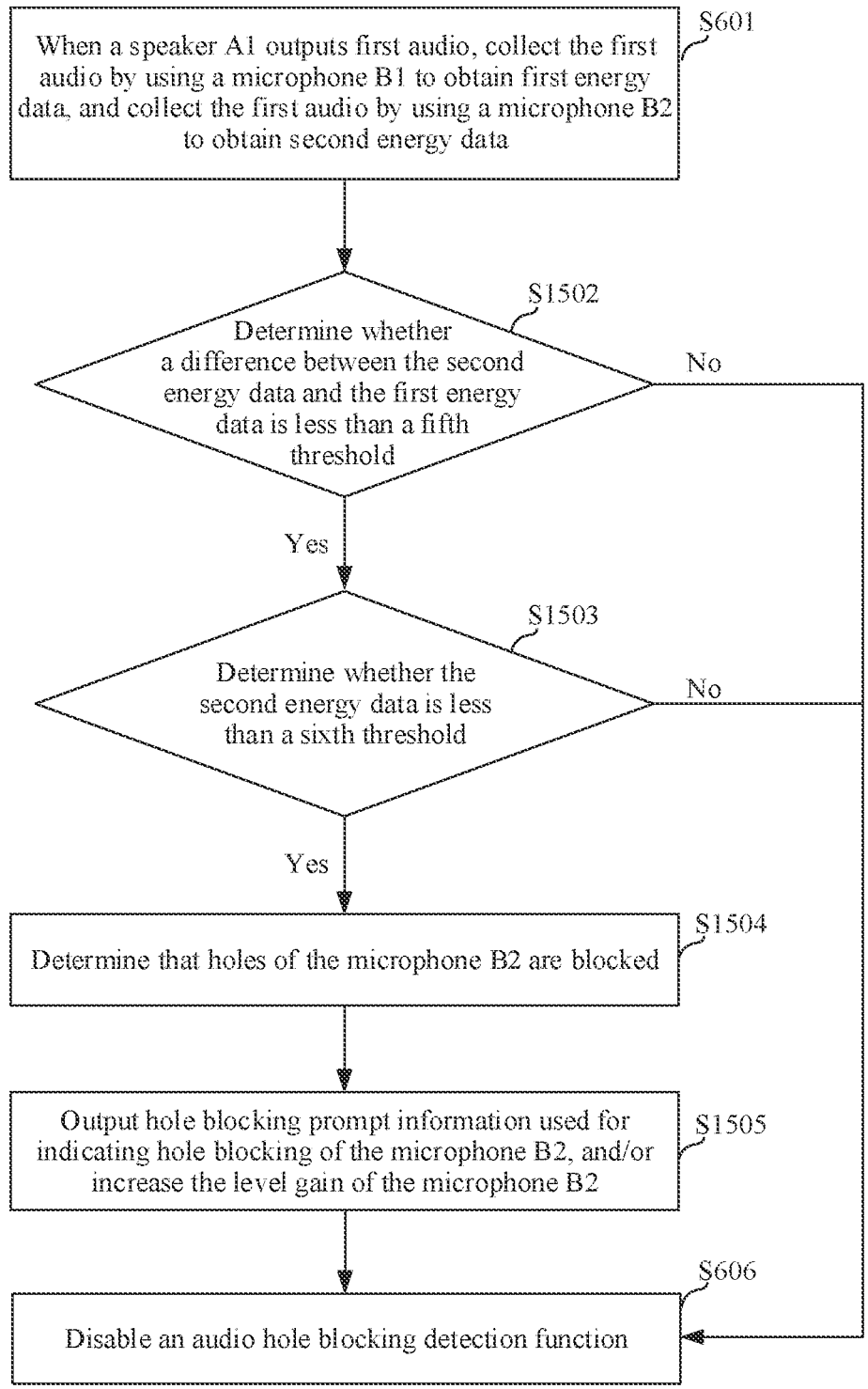
FIG. 15 is a schematic flowchart of another audio module detection method according to an embodiment of this application.
Figure 16:
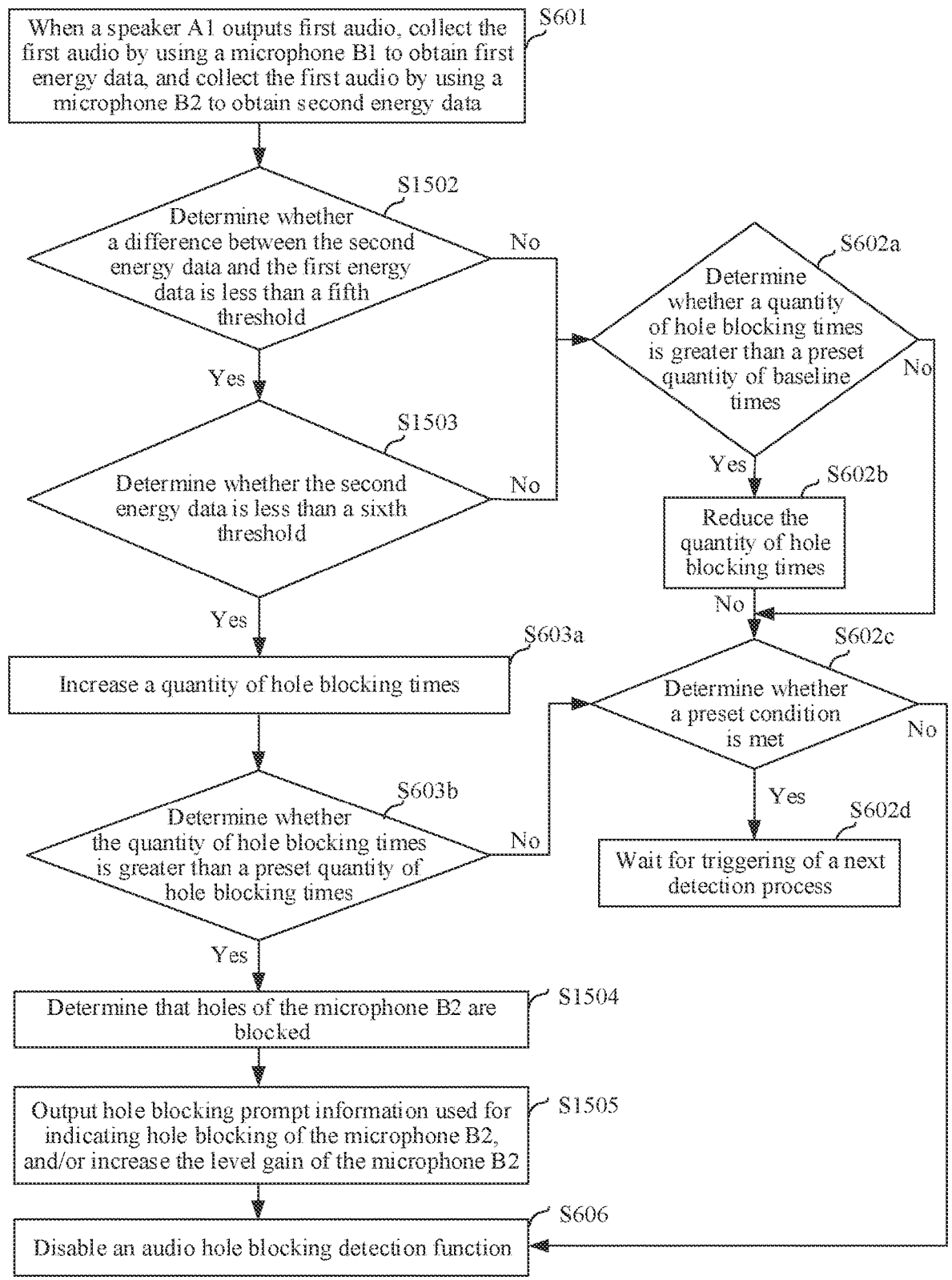
FIG. 16 is a schematic flowchart of another audio module detection method according to an embodiment of this application.

For example, as shown in FIG. 15 and FIG. 16, when the detected audio module is the microphone B2 in Embodiment 4 instead of the microphone B1 in Embodiment 3, different from the audio module detection method shown in FIG. 13 and FIG. 14, the audio module detection method shown in FIG. 15 and FIG. 16 is implemented by respectively replacing S1302, S1303, S1304, and S1305 with S1502, S1503, S1504, and S1505. Details are as follows:

S1502. Determine whether a difference between the second energy data and the first energy data is less than or equal to a fifth threshold.

If yes, S1503 is performed. If no, it is determined that holes of the microphone B2 are not blocked, and in this case, S606 may be performed.

It should be noted that there are also two manners of obtaining the first energy data and the second energy data. For specific implementation, refer to related content of S601 in Embodiment 1. Details are not described herein again. In addition, for comparability, preferably, the first energy data and the second energy data are obtained in a same manner. For specific implementation, refer to related S1302. Details are not described herein again.

To obtain the fifth threshold for determining whether holes of the microphone B2 are blocked, in this embodiment of this application, a set of hole blocking calibration energy data capable of indicating hole blocking of the microphone B2 may be obtained in advance. The following describes a process of obtaining the set of hole blocking calibration energy data.

Impurities are applied to a position of the microphone B2 of the electronic device 100 to simulate a case in which holes of the microphone B2 is blocked. In addition, hole blocking calibration energy data shown in Table 7 is obtained by using a detection process the same as that for Table 2.

TABLE 7

Detection status of hole blocking calibration energy data of the speaker A1 by using the microphone B2

| Volume level | Level gain | | | | |
|---|---|---|---|---|---|
| | $y_1$ | $y_2$ | $y_3$ | $y_4$ | $y_5$ |
| $x_1$ | $B2F_{11}$ | $B2F_{12}$ | $B2F_{13}$ | $B2F_{14}$ | $B2F_{15}$ |
| $x_2$ | $B2F_{21}$ | $B2F_{22}$ | $B2F_{23}$ | $B2F_{24}$ | $B2F_{25}$ |
| $x_3$ | $B2F_{31}$ | $B2F_{32}$ | $B2F_{33}$ | $B2F_{34}$ | $B2F_{35}$ |
| $x_4$ | $B2F_{41}$ | $B2F_{42}$ | $B2F_{43}$ | $B2F_{44}$ | $B2F_{45}$ |
| $x_5$ | $B2F_{51}$ | $B2F_{52}$ | $B2F_{53}$ | $B2F_{54}$ | $B2F_{55}$ |

$B2F_{ij}$ represents volume collected by the microphone B2 with blocked holes at $y_j$ when the speaker A1 without blocked holes outputs the test audio at $x_i$. Because the data in Table 7 is collected when holes of the microphone B2 are blocked, the hole blocking calibration energy data shown in Table 7 may be used to indicate a case in which holes of the microphone B2 are blocked.

It should be noted that, different from S1302, because the detected audio module is the microphone B2 instead of the microphone B1, in S1502, the second energy data collected by the microphone B2 is the minuend, and the first energy data collected by the microphone B1 is the subtrahend.

Based on this, different from the third threshold, the fifth threshold is obtained based on a difference between third hole blocking calibration data (representing volume collected when holes of the microphone B2 are not blocked) and the first calibration data (representing volume collected when holes of the microphone B1 are not blocked) superimposed with an error margin reserved for an error factor (such as accuracy of the microphone B2, and a difference between two audio sources: the test audio and the first audio). For reasons for superimposing the difference between the third hole blocking calibration data and the first calibration data with the error margin, refer to related description of the third threshold. Details are not described herein again.

The third hole blocking calibration data is used to indicate volume obtained by the microphone B2 with hole blocking by collecting the test audio output by the speaker A1 without blocked holes. Therefore, the third hole blocking calibration data may indicate that holes of the microphone B2 are blocked, and may be obtained based on Table 7. For a specific manner of obtaining the first calibration data, refer to related content of S602. The first calibration data may indicate that holes of neither of the speaker A1 and the microphone B1 are blocked, and the third hole blocking calibration data may indicate that holes of the microphone B2 are blocked. Therefore, the difference between the two may indicate that a status of the difference between the second energy data and the first energy data when holes of the microphone B2 are blocked.

It should be noted that, due to different manners of obtaining the first energy data and the second energy data, manners of obtaining the third hole blocking calibration data and the first calibration data also differ, which is specifically discussed in detail below.

In some embodiments of this application, if the first energy data and the second energy data in S1502 are obtained in Manner 1, the first calibration data is the calibration energy data corresponding to the first volume level and the first level gain in Table 1, and the third hole blocking calibration data is the hole blocking calibration energy data corresponding to the second volume level and the third level gain in Table 7.

The foregoing example is still used. If the first energy data is detected energy data $B_{ij}$ and the second energy data is detected energy data $F_{ij}$, the first calibration data is calibration energy data $ZB_{ij}$ and the third hole blocking calibration data is hole blocking calibration energy data $B2F_{ij}$. The fifth threshold may be a difference between the hole blocking calibration energy data $B1B_{ij}$ and the calibration energy data $ZF_{ij}$ superimposed with an error margin (for example, 2). For example, if the first energy data is detected energy data $B_{12}$ and the second energy data is detected energy data $F_{34}$, the fifth threshold is $(B2F_{34}-ZF_{12})+2$.

In some other embodiments of this application, if the first energy data and the second energy data in S1502 are obtained in Manner 1, the first calibration data is determined based on the first volume level in Table 2 and a plurality of pieces of calibration energy data in one-to-one correspondence with a plurality of third level gains, and the third hole blocking calibration data is determined based on a plurality of pieces of third hole blocking calibration energy data. The plurality of pieces of third hole blocking calibration energy data are volume that has values in one-to-one correspondence with all fourth level gains and that is obtained by the microphone B2 with blocked holes at the plurality of fourth level gains when the speaker A1 without blocked holes outputs the test audio at the second volume level. It can be learned that the third hole blocking calibration energy data and the second energy data are obtained at the same volume level and at the same plurality of level gains.

It should be understood that a manner in which the third hole blocking calibration data is determined based on the plurality of pieces of third hole blocking calibration energy data is the same as a manner in which the second energy data is determined based on the plurality of pieces of second detected energy data. Reference may be made thereto for implementation, and details are not described herein again. It should be noted that, if the first energy data and the second energy data in S1502 are obtained in Manner 1, the fifth threshold may also be determined based on this embodiment, which is not specifically limited in this application.

For example, if the first energy data is determined based on detected energy data $B_{11}$, $B_{13}$, and $B_{15}$ and the second energy data is determined based on detected energy data $F_{12}$, $F_{14}$, and $F_{15}$, the first calibration data is determined based on the calibration energy data $ZB_{11}$, $ZB_{13}$, and $ZB_{15}$ in Table 1 (for example, $ZB_1$). The foregoing plurality of pieces of third hole blocking calibration energy data are respectively the hole blocking calibration energy data $B2F_{12}$, $B2F_{14}$, and $B2F_{15}$ in Table 7. The third hole blocking calibration data is determined based on the hole blocking calibration energy data $B2F_{12}$, $B2F_{14}$, $B2F_{15}$ (for example, $B2F_1$), and the fifth threshold is $(B2F_1 - ZB_1) + 2$.

S1503. Determine whether the second energy data is less than a sixth threshold.

If yes, S1504 is performed. If no, it is determined that holes of the microphone B2 are not blocked, and in this case, S606 may be performed.

The sixth threshold used for determining whether holes of the microphone B2 are blocked may be obtained based on the third blocking calibration data superimposed with an error margin. The error margin is reserved for some misdetermining factors (such as accuracy of the microphone B2, and a difference between two audio sources: the test audio and the first audio). It should be noted that, for specific implementation of the third hole blocking calibration data, reference may be made to related description of S1502. Details are not described herein again.

The foregoing example is still used. If the second energy data is detected energy data $F_{ij}$, the third hole blocking calibration data is hole blocking calibration energy data $B2F_{ij}$. In this case, the sixth threshold may be a sum of the hole blocking calibration energy data $B2F_{ij}$ and the error margin (for example, 2). For example, if the second energy data is detected energy data $F_{12}$, the sixth threshold is $B2F_{12} + 2$.

If the second energy data is determined based on detected energy data $F_{11}$, $F_{13}$, and $F_{15}$, the third hole blocking calibration data is determined based on the hole blocking calibration energy data $B2F_{11}$, $B2F_{13}$, and $B2F_{15}$ in Table 6 (for example, $B2F_1$). In this case, the sixth threshold is $B2B_1 + 2$.

It should be understood that an execution order of the foregoing S1502 and S1503 may be reversed, which is not specifically limited in this embodiment of this application.

S1504. Determine that holes of the microphone B2 are blocked.

S1505. Output hole blocking prompt information used for indicating hole blocking of the microphone B2, and/or increase the level gain of the microphone B2.

For specific implementation of steps S1504 and S1505, refer to S1304 and S1305, respectively. Details are not described herein again.

It should be understood that the detection process for the microphone B2 in Embodiment 4 is similar to that in Embodiment 3, except that the detected audio module differs. Therefore, for an implementation effect of the audio module detection method shown in FIG. 15 and FIG. 16, refer to the technical effect of the audio module detection method shown in FIG. 13 and FIG. 14. Details are not described herein again.

It should be noted that a case in which the speaker A1 outputs the first audio is illustrated in Embodiment 3 and Embodiment 4. Because the speaker A1 has larger volume when outputting the first audio, an accuracy requirement for the microphone B1 and the microphone B2 are lower, and energy data obtained by the microphone B1 and the microphone B2 by collecting the first audio output by the speaker A1 is more accurate. It should be understood that, in other embodiments, a case in which the earpiece A2 in FIG. 1 outputs the first audio may also be used in Embodiment 3 and Embodiment 4, that is, the audio output module is the earpiece A2, which is not limited in this embodiment of this application. It should be understood that, when the earpiece A2 in FIG. 1 is used to output the first audio in Embodiment 3 and Embodiment 4, the first volume level and the second volume level each are any one of M volume levels, the first calibration data is obtained based on Table 3, and the second calibration data is obtained based on Table 4.

It should be further noted that, an example in which the first audio collection module is the microphone B1 and the second audio collection module is the microphone B2 is used for description in Embodiment 1 to Embodiment 4. In other embodiments, the first audio collection module may alternatively be the microphone B2, and the second audio collection module may alternatively be the microphone B1. There is no substantial difference in a specific implementation process. Reference may be made thereto for implementation, and details are not described herein again.

It can be learned from Embodiment 1 to Embodiment 4 that regardless of the detected audio module, in the audio module detection method provided in the embodiments of this application, two audio collection modules (such as the microphone B1 and the microphone B2 in FIG. 1, or such as two of the microphone B1, the microphone B2, and a microphone B3 in FIG. 2) are used to collect the first audio output by the audio output module (such as the speaker A1 or the earpiece A2), and a hole blocking status of the detected audio module is determined based on the first energy data and the second energy data obtained through collection.

In a solution of using a single audio collection module for detection, for example, using first energy data collected by the microphone B1 based on first audio output by the speaker A1 to determine a hole blocking status of a detected audio module, a hole blocking problem may occur in both the microphone B1 and the speaker A1, which can both greatly reduce the first energy data. Therefore, whether the microphone B1 or the speaker A1 has the problem cannot be determining by relying only on the first energy data, and consequently, misdetermining is likely to occur. In other words, misdetermining is likely to occur in the solution of using a single audio collection module for detection.

In this embodiment of this application, the hole blocking status of the detected audio module is determined based on the first energy data and the second energy data collected by two audio collection modules. Both the second energy data and the first energy data are related to the audio output module. Therefore, if holes of the audio output module are blocked, both the first energy data and the second energy data are affected. If holes of the first audio collection module or the second audio collection module are blocked, only the first energy data or the second energy data is affected. Reversely, a module with blocked holes can be determined by using different impact on the first energy data and the second energy data.

In addition, regardless of the detected audio module, only two pieces of data need to be collected for detection: the first energy data and the second energy data. A process of data collection is simple.

Based on the foregoing descriptions of the implementations, a person skilled in the art may clearly understand that for the purpose of convenient and brief descriptions, division into the foregoing function modules is merely used as an example for description. During actual application, the foregoing functions can be allocated to different function modules for implementation based on a requirement, that is, an inner structure of an apparatus is divided into different function modules to implement all or some of the functions described above. For detailed working processes of the foregoing system, apparatus, and unit, refer to corresponding processes in the foregoing method embodiments. Details are not described herein again.

Function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

In the following, the terms "first" and "second" are used merely for descriptive purposes, and cannot be understood as indicating or implying relative importance or implicitly indicating the quantity of indicated technical features. Therefore, a feature limited by "first" or "second" may expressly or implicitly include one or more of such features. In the description of the embodiments, unless otherwise specified, "a plurality of" means two or more.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope the embodiments of this application shall be subject to the protection scope of the claims.

What is claimed is:

1. An audio module detection method, applied to an electronic device, wherein the electronic device comprises an audio output module, a first audio collection module, and a second audio collection module, and the method comprises:
when the audio output module outputs first audio, obtaining first energy data by using the first audio collection module, and obtaining second energy data by using the second audio collection module, wherein the first energy data is used to indicate volume of the first audio collected by the first audio collection module, and the second energy data is used to indicate volume of the first audio collected by the second audio collection module; and
determining, based on the first energy data and the second energy data, whether holes of an audio module are blocked, wherein the audio module is the audio output module, the first audio collection module, or the second audio collection module.

2. The audio module detection method according to claim 1, wherein the determining, based on the first energy data and the second energy data, whether holes of an audio module are blocked comprises:
determining first status information based on the first energy data, wherein the first status information is used to indicate whether the first energy data is affected by hole blocking;
determining second status information based on the second energy data, wherein the second status information is used to indicate whether the second energy data is affected by hole blocking; and
determining, based on the first status information and the second status information, whether the audio module is blocked.

3. The audio module detection method according to claim 2, wherein the determining, based on the first status information and the second status information, whether the audio module is blocked comprises:
when the audio module is the audio output module, determining that holes of the audio output module are blocked if the first status information indicates that the first energy data is affected by hole blocking and the second status information indicates that the second energy data is affected by hole blocking;
when the audio module is the first audio collection module, determining that holes of the first audio collection module are blocked if the first status information indicates that the first energy data is affected by hole blocking and the second status information indicates that the second energy data is not affected by hole blocking; or
when the audio module is the second audio collection module, determining that holes of the audio output module are blocked if the first status information indicates that the first energy data is not affected by hole blocking and the second status information indicates that the second energy data is affected by hole blocking.

4. The audio module detection method according to claim 2, wherein the determining, based on the first status information and the second status information, whether the audio module is blocked comprises:
when the audio module is the audio output module, increasing a first quantity of hole blocking times if the first status information indicates that the first energy data is affected by hole blocking and the second status information indicates that the second energy data is affected by hole blocking; and determining that holes of the audio output module are blocked if the first quantity of hole blocking times is greater than a first preset quantity of hole blocking times;
when the audio module is the first audio collection module, increasing a second quantity of hole blocking times if the first status information indicates that the first energy data is affected by hole blocking and the second status information indicates that the second energy data is not affected by hole blocking; and determining that holes of the first audio collection module are blocked if the second quantity of hole blocking times is greater than a second preset quantity of hole blocking times; or when the audio module is the second audio collection module, increasing a third quantity of hole blocking times if the first status information indicates that the first energy data is not affected by hole blocking and the second status information indicates that the second energy data is affected by hole blocking, and determining that holes of the second audio collection module are blocked if the third quantity of hole blocking times is greater than a third preset quantity of hole blocking times.

5. The audio module detection method according to claim 2, wherein
the first energy data is volume collected by the first audio collection module at a first level gain or a plurality of second level gains when the audio output module outputs the first audio at a first volume level, wherein the first volume level is any volume level of at least two preset volume levels, the first level gain is any level gain of at least two first preset level gains, and the plurality of second level gains are any multiple level gains in the at least two first preset level gains; and
the second energy data is volume collected by the first audio collection module at a third level gain or a plurality of fourth level gains when the audio output module outputs the first audio at a second volume level, wherein the second volume level is any volume level of the at least two preset volume levels, the third level gain is any level gain of at least two second preset level gains, and the plurality of fourth level gains are any multiple volume levels in the at least two second preset level gains.

6. The audio module detection method according to claim 5, wherein the audio module is the audio output module;
the determining first status information based on the first energy data comprises:
determining the first status information based on first calibration data and the first energy data, wherein if a difference between the first calibration data and the first energy data is greater than a first threshold, the first status information is used to indicate that the first energy data is affected by hole blocking, and the first calibration data is volume collected by the first audio collection module without blocked holes when the audio output module outputs second audio without hole blocking; and
the determining second status information based on the second energy data comprises:
determining the second status information based on second calibration data and the second energy data, wherein if a difference between the second calibration data and the second energy data is greater than a second threshold, the second status information is used to indicate that the second energy data is affected by hole blocking, and the second calibration data is volume collected by the second audio collection module without blocked holes when the audio output module outputs the second audio without hole blocking.

7. The audio module detection method according to claim 6, wherein
the first energy data is energy data collected by the first audio collection module at the first level gain when the audio output module outputs the first audio at the first volume level; and
the first calibration data is energy data collected by the first audio collection module at the first level gain when the audio output module outputs the second audio at the first volume level.

8. The audio module detection method according to claim 6, wherein
the second energy data is energy data collected by the second audio collection module at the third level gain when the audio output module outputs the first audio at the second volume level; and
the second calibration data is energy data collected by the second audio collection module at the third level gain when the audio output module outputs the second audio at the second volume level.

9. The audio module detection method according to claim 6, wherein
the first energy data is determined based on a plurality of pieces of first detected energy data obtained by the first audio collection module, wherein the plurality of pieces of first detected energy data are volume that has values in one-to-one correspondence with all second level gains and that is obtained by the first audio collection module at the plurality of second level gains when the audio output module outputs the first audio at the first volume level; and
the first calibration data is determined based on a plurality of pieces of first calibration energy data obtained by the first audio collection module, wherein the plurality of pieces of first calibration energy data are volume that has values in one-to-one correspondence with all second level gains and that is obtained by the first audio collection module at the plurality of second level gains when the audio output module outputs the second audio at the first volume level.

10. The audio module detection method according to claim 6, wherein
the second energy data is determined based on a plurality of pieces of second detected energy data obtained by the second audio collection module, wherein the plurality of pieces of second detected energy data are volume that has values in one-to-one correspondence with all fourth level gains and that is obtained by the second audio collection module at the plurality of fourth level gains when the audio output module outputs the first audio at the second volume level; and
the second calibration data is determined based on a plurality of pieces of second calibration energy data obtained by the second audio collection module, wherein the plurality of pieces of second calibration energy data are volume that has values in one-to-one correspondence with all fourth level gains and that is obtained by the second audio collection module at the plurality of fourth level gains when the audio output module outputs the second audio at the second volume level.

11. The audio module detection method according to claim 5, wherein the audio module is the first audio collection module;
the determining first status information based on the first energy data comprises:
determining the first status information based on whether the first energy data is less than a fourth threshold, wherein if yes, the first status information is used to indicate whether the first energy data is affected by hole blocking; and
the determining second status information based on the second energy data comprises:
determining the second status information based on whether a difference between the first energy data and the second energy data is less than a third threshold, wherein if yes, the second status information is used to indicate that the second energy data is not affected by hole blocking.

12. The audio module detection method according to claim 11, wherein the first energy data is volume collected by the first audio collection module at the first level gain when the audio output module outputs the first audio at the first volume level; and the second energy data is volume collected by the second audio collection module at the third level gain when the audio output module outputs the first audio at the second volume level.

13. The audio module detection method according to claim 11, wherein the first energy data is determined based on a plurality of pieces of first detected energy data obtained by the first audio collection module, wherein the plurality of pieces of first detected energy data are volume that has values in one-to-one correspondence with all second level gains and that is obtained by the first audio collection module at the plurality of second level gains when the audio output module outputs a second audio at the first volume level; and the second energy data is determined based on a plurality of pieces of second detected energy data obtained by the second audio collection module, wherein the plurality of pieces of second detected energy data are volume that has values in one-to-one correspondence with all fourth level gains and that is obtained by the second audio collection module at the plurality of fourth level gains when the audio output module outputs the second audio at the second volume level.

14. The audio module detection method according to claim 5, wherein the audio module is the second audio collection module;

the determining first status information based on the first energy data comprises:

determining the first status information based on whether a difference between the second energy data and the first energy data is less than a fifth threshold, wherein if yes, the first status information is used to indicate that the first energy data is not affected by hole blocking; and the determining second status information based on the second energy data comprises:

determining the second status information based on whether the second energy data is less than a sixth threshold, wherein if yes, the second status information is used to indicate whether the second energy data is affected by hole blocking.

15. The audio module detection method according to claim 14, wherein the first energy data is volume collected by the first audio collection module at the first level gain when the audio output module outputs the first audio at the first volume level; and the second energy data is volume collected by the second audio collection module at the third level gain when the audio output module outputs the first audio at the second volume level.

16. The audio module detection method according to claim 14, wherein the first energy data is determined based on a plurality of pieces of first detected energy data obtained by the first audio collection module, wherein the plurality of pieces of first detected energy data are volume that has values in one-to-one correspondence with all second level gains and that is obtained by the first audio collection module at the plurality of second level gains when the audio output module outputs the first audio at the first volume level; and the second energy data is determined based on a plurality of pieces of second detected energy data obtained by the second audio collection module, wherein the plurality of pieces of second detected energy data are volume that has values in one-to-one correspondence with all fourth level gains and that is obtained by the second audio collection module at the plurality of fourth level gains when the audio output module outputs the first audio at the second volume level.

17. The audio module detection method according to claim 1, wherein the method further comprises:

when it is determined that holes of the audio module are blocked, outputting hole blocking prompt information, and/or increasing a gain value of the audio module.

18. The audio module detection method according to claim 1, wherein the electronic device has an enable control, and the enable control is configured to enable an operation of detecting whether holes of the audio module are blocked; and the electronic device detects whether holes of the audio module are blocked, in response to an enable operation of a user on the enable control, or based on a preset period, wherein the preset period is a time interval required for consecutively detecting twice whether holes of the audio module are blocked.

19. An electronic device, comprising a memory, a processor, and a computer program stored in the memory and executable on the processor, wherein when the processor executes the computer program, the electronic device is enabled to implement the audio module detection method according to claim 1.

20. A non-transitory computer readable storage medium, wherein the non-transitory computer readable storage medium stores a computer program, and when the computer program is executed by a processor, the audio module detection method according to claim 1 is implemented.

* * * * *